US006439454B1

(12) United States Patent
Masson et al.

(10) Patent No.: US 6,439,454 B1
(45) Date of Patent: Aug. 27, 2002

(54) TRANSACTION PRINTER

(75) Inventors: Bernard V. Masson, Riverton; David J. Walson, Lander, both of WY (US); Robert J. Brice, Corvallis, OR (US); Robert M. Yraceburu, Camas, WA (US); Russel H. Marvin, Templeton, CA (US); Michael V. Fell, Englewood, CO (US); Paul J. Vogt, Littleton, CO (US); Earney Stoutenburg, Highland Ranch, CO (US); Dan R. Carrington, Littleton, CO (US)

(73) Assignee: Axiohm Transaction Solutions, Inc., Ithaca, NY (US)

( * ) Notice: Subject to any disclaimer, the term of this patent is extended or adjusted under 35 U.S.C. 154(b) by 0 days.

(21) Appl. No.: 09/694,230

(22) Filed: Oct. 23, 2000

Related U.S. Application Data

(60) Division of application No. 08/727,853, filed on Oct. 4, 1996, which is a continuation-in-part of application No. 08/360,203, filed on Dec. 20, 1994, now abandoned.

(51) Int. Cl.[7] .......................... G06F 17/00; G06F 17/60
(52) U.S. Cl. ........................................ 235/375; 235/379
(58) Field of Search ................................ 235/375, 379, 235/384; 902/18

(56) References Cited

U.S. PATENT DOCUMENTS

| | | |
|---|---|---|
| 3,121,531 A | 2/1964 | Bumpus, Jr. et al. |
| 3,555,246 A | 1/1971 | Lemelson |
| 3,636,702 A | 1/1972 | Gutmann |
| 3,710,078 A | 1/1973 | Lemelson |
| 3,735,350 A | 5/1973 | Lemelson |
| 3,881,053 A | 4/1975 | Lemelson |
| 3,918,029 A | 11/1975 | Lemelson |
| 3,940,795 A | 2/1976 | Lemelson |
| 3,943,563 A | 3/1976 | Lemelson |
| 3,949,363 A | 4/1976 | Holm |
| 4,007,462 A | 2/1977 | Wetsel, Jr. |
| 4,020,972 A | 5/1977 | Lundblad |
| 4,023,013 A | 5/1977 | Kinker |
| 4,025,023 A | 5/1977 | Moffitt |
| 4,025,905 A | 5/1977 | Gorgens |
| 4,027,142 A | 5/1977 | Paup et al. |
| 4,060,177 A | 11/1977 | Surber, Jr. |
| 4,069,957 A | 1/1978 | Moffitt |

(List continued on next page.)

FOREIGN PATENT DOCUMENTS

WO WO 9409580 A1 * 4/1994 ............. H04L/9/10

*Primary Examiner*—Karl D. Frech
*Assistant Examiner*—April A. Nowlin
(74) *Attorney, Agent, or Firm*—Watts, Hoffman, Fisher & Heinke Co.

(57) ABSTRACT

A system for issuing printed documents exchangeable for value having interconnected printer and feeder modules. The printer module includes a printing station having a printhead supported for reciprocal movement in a direction transverse to the path of movement of the print medium. A sensor carried by the printhead is operative to sense and read preprinted indicia on the print medium. The feeder module includes a receptacle for storing the print medium as a continuous form. A slot is provided for enabling the insertion of print media external to the feeder module. A gate mechanism blocks the feed slot under predetermined operating conditions. A first drive mechanism is operative to feed the print medium from the receptacle towards the printing station. A severing mechanism is operative to sever the lead document from the supply. A severing sensor detects failure of the severing mechanism. A second drive mechanism in the printer advances the severed print medium through the printer to a location at which the printhead prints indicia on at least a portion of the print medium. Several security features are also provided to inhibit or prevent the unauthorized removal of print medium from the feeder module and to control access to the interior of the modules.

9 Claims, 15 Drawing Sheets

U.S. PATENT DOCUMENTS 4,084,198 A 4/1978 Lemelson
4,118,022 A 10/1978 Rayfield et al.
4,118,730 A 10/1978 Lemelson
4,142,235 A 2/1979 Tadakuma et al.
4,145,035 A 3/1979 Moser
4,148,061 A 4/1979 Lemelson
4,175,694 A 11/1979 Donabin
4,179,031 A 12/1979 Ward
4,186,977 A 2/1980 Gilovich et al.
4,201,978 A 5/1980 Nally
4,212,037 A 7/1980 Lemelson
4,222,511 A 9/1980 Schueler
4,249,163 A 2/1981 Maurer
4,253,016 A 2/1981 Hirose
4,261,497 A 4/1981 Roetter et al.
4,269,341 A 5/1981 Polko
4,312,277 A 1/1982 Graef et al.
4,316,073 A 2/1982 Lemelson
4,317,957 A 3/1982 Sendrow
4,321,672 A 3/1982 Braun et al.
4,338,626 A 7/1982 Lemelson
4,349,741 A 9/1982 Bobart et al.
4,358,671 A 11/1982 Case
4,367,666 A 1/1983 Toth
4,370,006 A 1/1983 Graef et al.
4,385,285 A 5/1983 Horst et al.
4,390,968 A 6/1983 Hennessey et al.
4,397,410 A 8/1983 Schueler
4,423,415 A 12/1983 Goldman
4,434,931 A 3/1984 Hunt et al.
4,438,704 A 3/1984 Hutcheon
4,447,097 A 5/1984 Lafevers et al.
4,447,714 A 5/1984 Lundblad
4,452,390 A 6/1984 West
4,459,052 A 7/1984 Lundblad
4,465,925 A 8/1984 Goi
4,487,306 A 12/1984 Nao et al.
4,494,743 A 1/1985 Kushmaul et al.
4,504,052 A 3/1985 Murck et al.
4,511,918 A 4/1985 Lemelson
4,527,845 A 7/1985 Kokubo et al.
4,529,114 A 7/1985 Casper et al.
4,529,118 A 7/1985 Granzow et al.
4,529,199 A 7/1985 Granzow et al.
4,540,106 A 9/1985 Fukatsu
4,546,352 A 10/1985 Goldman
4,580,422 A 4/1986 Wills
4,593,183 A 6/1986 Fukatsu
4,597,340 A 7/1986 Huckle
4,598,810 A 7/1986 Shore et al.
4,600,828 A 7/1986 Nogami et al.
4,602,332 A 7/1986 Hirose et al.
4,618,085 A 10/1986 Kimura et al.
4,623,081 A 11/1986 Hain et al.
4,623,965 A 11/1986 Wing et al.
4,625,275 A 11/1986 Smith
4,625,870 A 12/1986 Nao et al.
4,637,523 A 1/1987 Levasseur
4,650,977 A 3/1987 Couch
4,653,009 A 3/1987 Brown
4,653,109 A 3/1987 Lemelson et al.
4,655,368 A 4/1987 Bateman
4,655,391 A 4/1987 Granzow et al.
4,659,008 A 4/1987 Howett et al.
4,672,377 A 6/1987 Murphy et al.
4,675,498 A 6/1987 Lemelson
4,675,669 A 6/1987 Goldman
4,678,896 A 7/1987 Carlson
4,681,229 A 7/1987 Uesaka et al.
4,688,708 A 8/1987 Irvine et al.
4,697,071 A 9/1987 Hiraoka et al.
4,698,630 A 10/1987 Ellsberg
4,699,532 A 10/1987 Smith
4,703,162 A 10/1987 Holland-Letz et al.
4,704,518 A 11/1987 Brunn et al.
4,716,799 A 1/1988 Hartmann
4,717,043 A 1/1988 Groover et al.
4,720,785 A 1/1988 Shapiro
4,754,126 A 6/1988 Caldwell
4,787,050 A 11/1988 Suzuki
4,809,837 A 3/1989 Hayashi
4,810,866 A 3/1989 Lord, Jr.
4,812,629 A 3/1989 O'Neil et al.
4,812,985 A 3/1989 Hambrick et al.
4,812,986 A 3/1989 Smith
4,820,909 A 4/1989 Kawauchi et al.
4,833,312 A 5/1989 Minematsu
4,851,075 A 7/1989 Parker
4,866,254 A 9/1989 Okayama et al.
4,870,596 A 9/1989 Smith
4,884,698 A 12/1989 Tutamune et al.
4,894,784 A 1/1990 Smith
4,899,172 A 2/1990 Berson et al.
4,926,193 A 5/1990 Berson et al.
4,928,133 A * 5/1990 Fulton ........................ 346/150
4,945,213 A 7/1990 Didiergeorge
4,965,568 A 10/1990 Atalla
4,965,829 A 10/1990 Lemelson
4,972,958 A 11/1990 Ito et al.
4,979,029 A 12/1990 Lemelson
4,982,337 A 1/1991 Burr et al.
4,984,073 A 1/1991 Lemelson
4,988,174 A 1/1991 Thomson et al.
4,992,647 A 2/1991 Konish et al.
5,000,322 A 3/1991 Goi
5,012,075 A 4/1991 Hutchison et al.
5,014,212 A 5/1991 Smith
5,019,249 A 5/1991 Sugai et al.
5,021,967 A 6/1991 Smith
5,023,714 A 6/1991 Lemelson
5,023,782 A 6/1991 Lutz et al.
5,025,139 A 6/1991 Halliburton, Jr.
5,051,190 A 9/1991 Ito et al.
5,055,657 A 10/1991 Miller et al.
5,056,643 A 10/1991 Kirberg
5,060,838 A 10/1991 Gergely, Jr. et al.
5,067,012 A 11/1991 Lemelson
5,075,875 A 12/1991 Love et al.
5,076,441 A 12/1991 Gerlier
5,078,522 A 1/1992 Nishizawa et al.
5,096,067 A 3/1992 Tutamune et al.
5,101,979 A 4/1992 Uno et al.
5,105,364 A 4/1992 Kawamura et al.
5,118,348 A 6/1992 Glavin et al.
5,119,205 A 6/1992 Lemelson
5,119,293 A 6/1992 Hammond
5,119,969 A 6/1992 Haber
5,121,945 A 6/1992 Thomson et al.
5,122,967 A 6/1992 Gilham
5,128,752 A 7/1992 Von Kohorn
5,128,753 A 7/1992 Lemelson
5,141,142 A 8/1992 Ramsey
5,152,512 A 10/1992 Yoshida et al.
5,173,590 A 12/1992 Nakano et al.
5,186,334 A 2/1993 Fukudome et al.
5,187,351 A 2/1993 Clary
5,199,697 A 4/1993 Yamada et al.
5,222,624 A 6/1993 Burr
5,228,112 A 7/1993 Lemelson
5,239,480 A 8/1993 Huegel
5,243,174 A 9/1993 Veeneman et al.

| | | | | | |
|---|---|---|---|---|---|
| 5,245,164 | A | | 9/1993 | Oyama et al. | |
| 5,247,159 | A | | 9/1993 | Yuge et al. | |
| 5,249,045 | A | | 9/1993 | Lemelson | |
| 5,250,793 | A | | 10/1993 | Nagashima et al. | |
| 5,254,841 | A | | 10/1993 | Watabe et al. | |
| 5,259,678 | A | | 11/1993 | Uchida | |
| 5,272,321 | A | | 12/1993 | Otsuka et al. | |
| 5,273,183 | A | | 12/1993 | Tuttobene | |
| 5,283,641 | A | | 2/1994 | Lemelson | |
| 5,285,384 | A | | 2/1994 | Gineris | |
| 5,290,033 | A | | 3/1994 | Bittner et al. | |
| 5,291,472 | A | | 3/1994 | Lemelson | |
| 5,292,283 | A | | 3/1994 | Koper et al. | |
| 5,307,423 | A | | 4/1994 | Gupta et al. | |
| 5,313,050 | A | | 5/1994 | Hiroki et al. | |
| 5,317,654 | A | | 5/1994 | Perry et al. | |
| 5,321,242 | A | | 6/1994 | Heath, Jr. | |
| 5,335,484 | A | | 8/1994 | Hain | |
| 5,348,299 | A | | 9/1994 | Clapper, Jr. | |
| 5,349,534 | A | | 9/1994 | Rousseff et al. | |
| 5,351,078 | A | | 9/1994 | Lemelson | |
| 5,369,709 | A | * | 11/1994 | Foreman et al. | 380/51 |
| 5,377,271 | A | * | 12/1994 | Foreman et al. | 380/51 |
| 5,477,037 | A | * | 12/1995 | Berger | 235/379 |
| 5,909,673 | A | * | 6/1999 | Gregory | 705/45 |
| 6,015,087 | A | * | 1/2000 | Seifert et al. | 235/379 |

* cited by examiner

TRANSACTION PRINTER

RELATED APPLICATION

"This is a Divisional application of application Ser. No.08/727,853, filed on Oct. 4, 1996".

This application is a continuation-in-part patent application of U.S. application Ser. No. 08/360,203, filed Dec. 20, 1994, and entitled "Transaction Printer".

TECHNICAL FIELD

The present invention relates generally to a printing apparatus and method and, more particularly, to a transaction printer of the type used in printing certain documents, such as negotiable instruments, tickets, coupons and the like.

BACKGROUND ART

Printing mechanisms are used in various applications. One such application is the printing of money orders at a retail establishment. A known money order generating system includes a terminal with a keyboard for entering data and a printer mechanism for printing the money order. Such a system has been sold as the AMOD 2000 system by integrated Payment Systems, Inc. of Englewood, Colorado. The terminal of this system may be located near a point of sale location and in some instances may be connected to a cash register. A host system may provide accounting functions and verification functions and may even control operation of the printer.

Known money order generating systems such as the Amod 2000 include a supply of blank money order forms loaded into the terminal by an authorized individual. The terminal is then, typically, locked to prevent access to the blank money order forms by unauthorized persons. Generally, the individual loading the blank forms, enters a pre-printed starting sequence number for the forms that have been loaded. As the money orders are printed and dispensed from the terminal, the terminal maintains a record of the money orders as they are printed. However, the terminal assumes that the money order number is the starting number entered plus the number of money orders printed since loading. The terminal has no way of confirming the number that is preprinted on the money order. In instances where a paper jam occurs in the printer mechanism or some other occurrence necessitates the removal and destruction of one of the blank money order forms from the printer, the information maintained by the host computer is erroneous. Thus, the amounts assigned to a particular money order number will not match when the money orders are returned for reconciliation with a ledger maintained by the system.

Because blank money order forms are negotiable instruments for large amounts of money, provision must also be made to maintain security of the money order generating system both electronically and mechanically. As used herein, the forms held in storage are negotiable instruments in that they comprise completed signature blocks. Access to a compartment containing the blank money order forms must be restricted only to authorized individuals and provision must be made to restrict the ability to pull the blank money order forms from the printing mechanism and any associated feed mechanism.

One problem associated with prior systems is security in the event of a power loss. If power is lost during printing and the chain of blank forms is still intact, an unauthorized party may be able to extract blank forms from the device by pulling the form being printed. Prior systems have used complex mechanisms to trigger pins that are forced into the paper chain when tension is sensed on the chain. Such systems are susceptible to failure and false activation due to their complexity.

DISCLOSURE OF THE INVENTION

The present invention provides a new and improved transaction printer which is capable of printing and dispensing negotiable instruments, such as money orders, official checks, other retail items such as gift certificates, coupons and tickets and other printed documents having value. For purposes of explanation, the invention will be described as it would be used in a money order dispensing application. However, it should be understood that the invention is not limited to this application.

According to one embodiment of the present invention, the printer includes an interconnected printing module and feeder module. The printing module includes a printing member, preferably a printhead assembly which is mounted for transverse movement with respect to a path of movement for a print medium, which may comprise, for example, money order forms. According to one embodiment of the present invention, the printhead assembly carries a sensor which is used to detect the leading edge of the money order form. According to one embodiment, the sensor reads a "top of form" mark preprinted on the money order form. The "top of form" mark serves as a reference by which printing positions and other functions, i.e. bursting, are determined. The sensor may be used to detect other alignment marks printed on the form. According to an alternate embodiment of the invention, the sensor directly detects the leading edge of the money order form, and/or a second "top of form" mark to assure correct form position.

The sensor is also operative to read preprinted indicia or symbology on the money order forms. This symbology may comprise, for example, bar codes, binary codes, characters to be ready by optical character recognition systems, magnetic characters to be read magnetically or any other form of encoded material. When the printer is used in the illustrated money order dispensing application, each individual money order form includes a preprinted bar code which among other information includes the money order number. When the printer is coupled to a host computer, the bar code information is read by the sensor on the printhead assembly and is sent to the host computer which uses this information to verify operation of the printer and to track accounting information associated with the generation of each money order. Should a bar code not be sensed or an inappropriate code read after multiple attempts, further operation of the printer would be inhibited by a local system until the problem is attended to and corrected. The local system serves to direct operation of the printer and may comprise, for example, a terminal, a personal computer, a point of sale device, a network server or other suitable processing system. The present invention also contemplates a printer in which operation of the printer is inhibited using a mechanism and/or software contained within the printer itself.

According to one embodiment of the present invention, the feeder modulel includes a receptacle compartment for containing a plurality of blank forms which may comprise a chain of interconnected negotiable instruments such as money orders. A first feed mechanism is used to advance the lead money order from the receptacle. A bursting mechanism forming part of the printer is used to sever the lead money order from the supply of blank money order forms when the lead money order has advanced to a predetermined position. According to one embodiment of the invention, the burster is located in the feeder module and the money order form is not severed until the sensor carried on the printhead is used to verify that the correct document is present and is positioned correctly.

In a more preferred embodiment, a burst sensor is also provided for detecting failure of the burster mechanism to severe the lead money order. In the illustrated embodiment, an optical sensor is located downstream of the bursting mechanism and detects failure of the document to separate from the document supply.

The printer includes a second feed mechanism which is used to feed the severed money order form through a printing station, forming part of the printing module, where the money order information including a receipt is printed on the money order form. According to one embodiment, the system is arranged such that a blank money order form includes two transverse portions, the leading portion in the path of movement of the money order through the printer being a receipt portion and the lagging portion being the negotiable money order itself. The bar code is preferably preprinted on the receipt portion of the money order form at a predetermined location near the leading edge of the form.

According to one embodiment of the invention, a single drive motor is used to drive both the first and second feed mechanisms. A coupling mechanism, which may be solenoid operated, is used to couple the first feed mechanism associated with the feeder module to the second feed mechanism in the printer. In operation, actuation of the coupling solenoid and drive motor drives both mechanisms. With the coupling solenoid deenergized, the drive motor only drives the second feed mechanism.

According to another feature of the invention, a provision is made for inserting an external print medium such as an sheet of paper, directly into the printer. With this feature, other documents, such as transaction summaries, reports or log sheets can be printed by the printing module without the need for removing the money order forms from the feeder or separating the feeder module from the printing module.

In a further embodiment of this feature, the provision is provided by a slot through which the external print medium is inserted into the paper path of the feeder. According to this embodiment, a gate mechanism is located near the base of the slot which is movable between opened and closed positions. Under predetermined operating conditions, the gate mechanism moves to a position at which the slot is blocked inhibiting insertion of external print medium into the paper path. In the preferred embodiment, the gate mechanism includes ribs aligned with openings in a support plate over which the money order forms travel during printing. When a money order is being advanced, the openings are blocked thereby preventing the gate mechanism for moving to its opened position at which an external print medium can be inserted.

According to another feature of the invention, the feeder module is coupled to the printing module by a locking mechanism which allows only authorized personnel to separate the feeder module from the printing module in order to gain access to the blank money order forms held in the compartment forming part of the feeder module. According to one embodiment, this mechanism is a software controlled system to prevent the necessity of mechanical keys.

According to one embodiment of the this feature, a pin/slot arrangement is provided which comprises a spring biased, solenoid operated pin on the printing station engaged with a slot formed on a tongue extending from the feeder module. At least one of the locking elements is tapered, preferably the pin, to enable the feeder to be coupled with the printing module without requiring an unlocking operation. The tongue displaces the spring-loaded pin connected to the solenoid when the feeder module is moved into place on the printing module. When the feeder module reaches its installed position, a hole in the tongue is aligned with the pin which allows the spring-loaded pin to move into the hole thereby preventing separation of the feeder module from the printing module. The feeder module can only be removed by energizing the solenoid to retract the pin.

The printer is connected to a local system. The local system controls actuation of the solenoid by requiring the input of a special password or security code by an authorized user at the printer location in order to actuate the solenoid and thereby permit the feeder module to be separated from the printing module.

According to a further aspect of this feature, a provision is made to verify the money order supply after the feeder module is reattached to the printer. In the preferred embodiment, upon attachment of the feeder, the lead money order is advanced to the verifying position at which the indicia, i.e., barcode is read by the sensor. Data related to the indicia read by the sensor is transmitted and may be compared with previously stored data to determine whether the money orders now in the module are in sequence, properly installed, etc. After completing this initial verifying step, the lead money order form is retracted by the feed mechanism to await a command to print a money order. This feature, reduces the possibility of tampering with the money order supply. Since, in the preferred embodiment, a password must be keyed into the system in order to unlock the feeder from the printer, data relating to the time of day and identity of the individual who keyed in the information can be maintained so that should the initial verifying step determine a problem with the money orders, the source of the problem can be more easily traced.

According to another embodiment of the invention, unauthorized removal of the lead money order, while still connected to the money order supply, is inhibited. According to one embodiment, an interlocking cover arrangement is provided to restrict access to the paper path, while the lead money order is still connected to the money order supply. By the use of interlocking structure between the covers that provide access to the interior of the printer module, the covers can only be opened after the feeder module is decoupled from the printer module. In other words, the printer module covers can only be opened after the feeder-to-printer coupling mechanism is released. In addition, the paper path in the printer module is arranged such that the leading edge of the money order being processed is not accessible from the output end of the printer module until it has been severed from the rest of the supply. In addition, portions of the cover are positioned in the paper path to prevent an individual from gripping the leading money order by reaching through the exit of the printer module while the money order is still connected to the rest of the supply.

According to an alternate embodiment of this invention, a feeder locking mechanism is provided for inhibiting removal of money order forms from the printer by someone pulling on the lead money order. According to this embodiment, the feeder locking mechanism includes a member that is operative to pinch the lead money order between a pinch arm and structure forming part of the paper path. A clamping arrangement may also inhibit rotation in one or more rollers forming part of the first feed mechanism. The feeder locking mechanism may be unlocked by linkage operated by the coupling solenoid which also operates to couple the first feed mechanism to the second feed mechanism whenever money order forms are to be advanced from the feeder module.

According to still another embodiment of the invention, the printer includes structure by which it may be locked to a support surface, such as a tabletop or counter in a retail environment. According to this embodiment, the printing station includes a retractable lock member which is extendable downwardly from the printer. The locking member is intended to extend through a hole formed in the tabletop and includes a slot or hole through which a locking device can be installed in order to secure the printer to the tabletop and prevent its unauthorized removal. According to another embodiment, the strip is slidably held to the printing module and the retracted position of the strip is maintained for applications where the locking member is not used.

According to another feature of the invention, the feeder locking mechanism may be unlocked, one time, by inserting a special, hand-held key or tool to release the feeder module from the printer module. As described above, a solenoid operated pin, preferably under the control of software, is used to lock the feeder mechanism to the printer. In the event of a failure in the circuit for energizing the solenoid, or in the event of a total power failure, the key allows the user to decouple the feeder from the printer in order to remove and secure the money order forms. In the preferred embodiment, the hand-held key locks itself within the printer upon insertion and can only be removed by a service technician. In this way, unauthorized multiple uses of the key are inhibited. In the preferred and illustrated embodiment of this feature, an internal slot in the side frame of the printer is adapted to receive the specially shaped key. A frangible cover section overlies the frame slot and is pierced by the key as it is inserted. Gripping members, such as claws, forming part of the key engage the side frame upon insertion and prevent its removal.

A ribbon cartridge is also disclosed which is usable with the disclosed printing apparatus. The ribbon cartridge includes a housing defined by a cover and base which forms a ribbon supply chamber. According to one aspect of the invention, the cover is held to the base by a pin/socket arrangement. The sockets which are preferably molded in plastic include a plurality of radially directed ribs which define an opening smaller than the cross-section of the pin. When the cover and base are assembled, a pin associated with the cover enters a socket associated with the base, in an interfering relationship. In the preferred embodiment, the ribs in the socket deform to accommodate insertion of the pin. The interference fit provided by the pin/socket engagement maintains the cover to the base. It should be understood, however, that the position of the pins and sockets can be reversed, i.e., the pins can be formed in the base and the sockets formed in the cover.

According to a further feature of the ribbon cartridge, molded spring arms are used to apply forces to confronting drive members that are used to advance the ribbon. At least one of the fingers include a T-section which cooperates with an abutment to provide a resilient biasing force against an associated drive member. With the disclosed T-bar arrangement, consistent forces can be applied to the ribbon which normally travels through a nip defined by the drive members. In addition, reduced torque is needed to rotate a ribbon driving members.

A more complete understanding of the advantages of the present invention may be acquired by referring to the detailed description of the invention taken in conjunction with the accompanying Figures in which like reference numbers indicate like features and wherein:

BEST MODE FOR CARRYING OUT THE INVENTION

Figure 1:
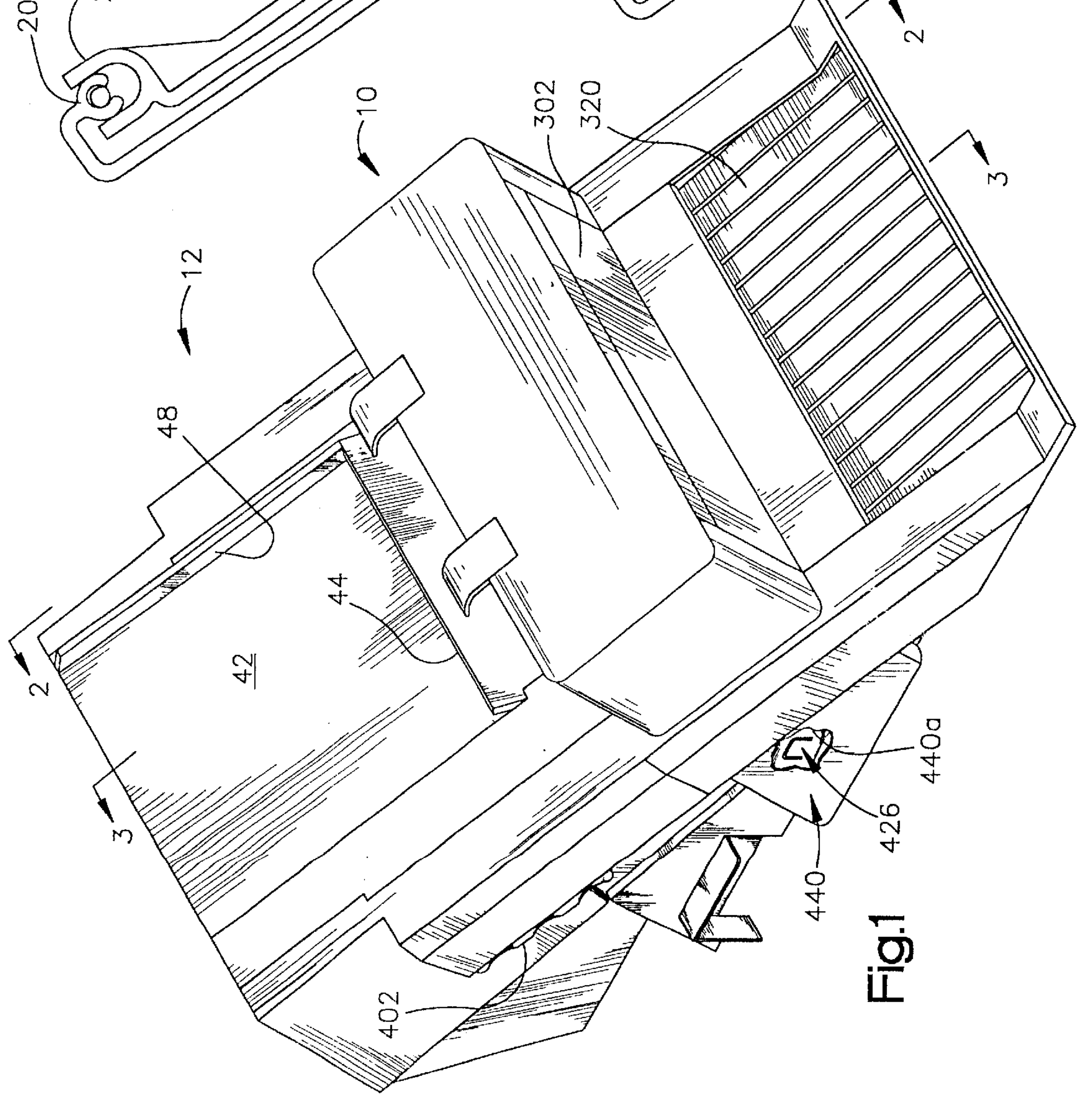
FIG. 1 is a perspective view of a printing system having an interconnected printing module and feed module constructed in accordance with one embodiment of the invention with a portion broken away to show an interior feature.
Figure 2:
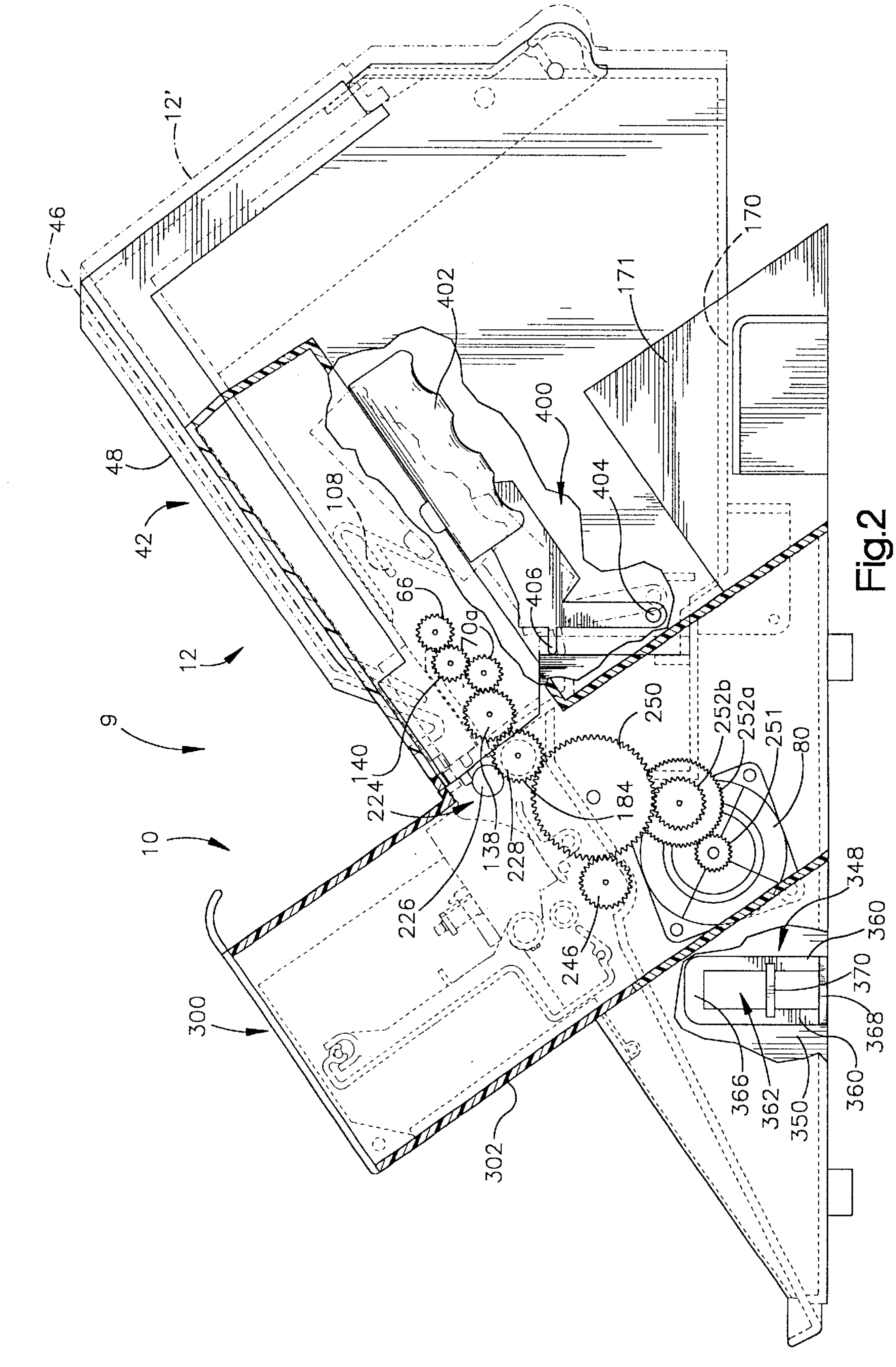
FIG. 2 is a sectional view of the printer shown in FIG. 1 as seen from the plane indicated by the line 2—2 in FIG. 1.
Figure 3:
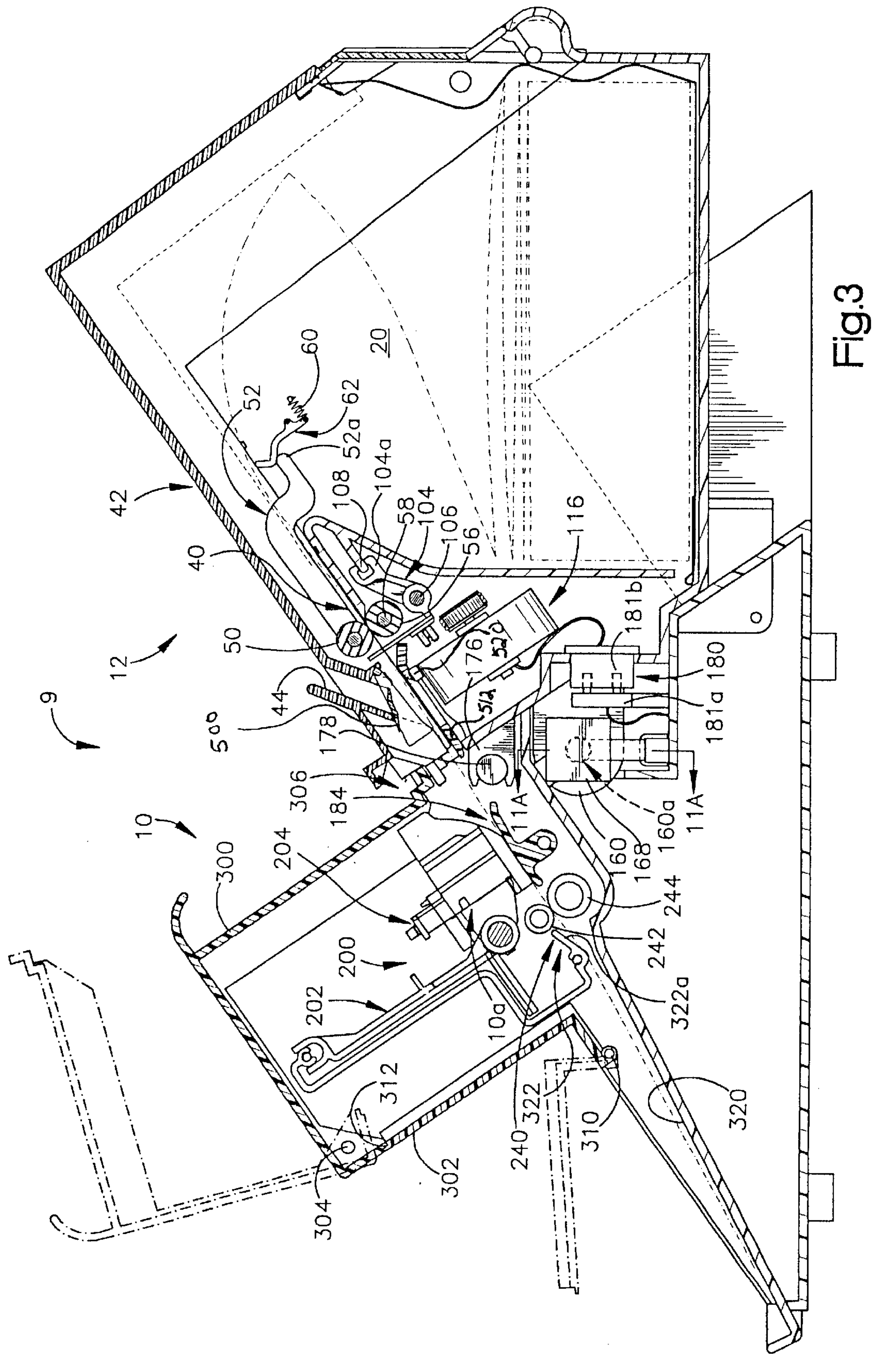
FIG. 3 is a sectional view of the printer as seen from the plane indicated by the line 3—3 in FIG. 1.

FIGS. 1–3 illustrate the overall construction of a transaction printer assembly 9 constructed in accordance with one embodiment of the invention. The printer 9 comprises an interconnected printing module 10 and feeder module 12. The printer assembly 9 has several features which make it especially suitable for generating and/or dispensing negotiable instruments, such as money orders. However, it should be understood that the present invention is adaptable to a wide variety of other applications, such as the printing and dispensing of tickets, vouchers, gift certificates, money drafts, coupons and other printed documents exchangeable for value. As such, the present invention should not be considered limited to a money order generating and dispensing application. To facilitate the explanation, however, the present invention will be described as it would be used as a money order generating and dispensing system.

Figure 5A:
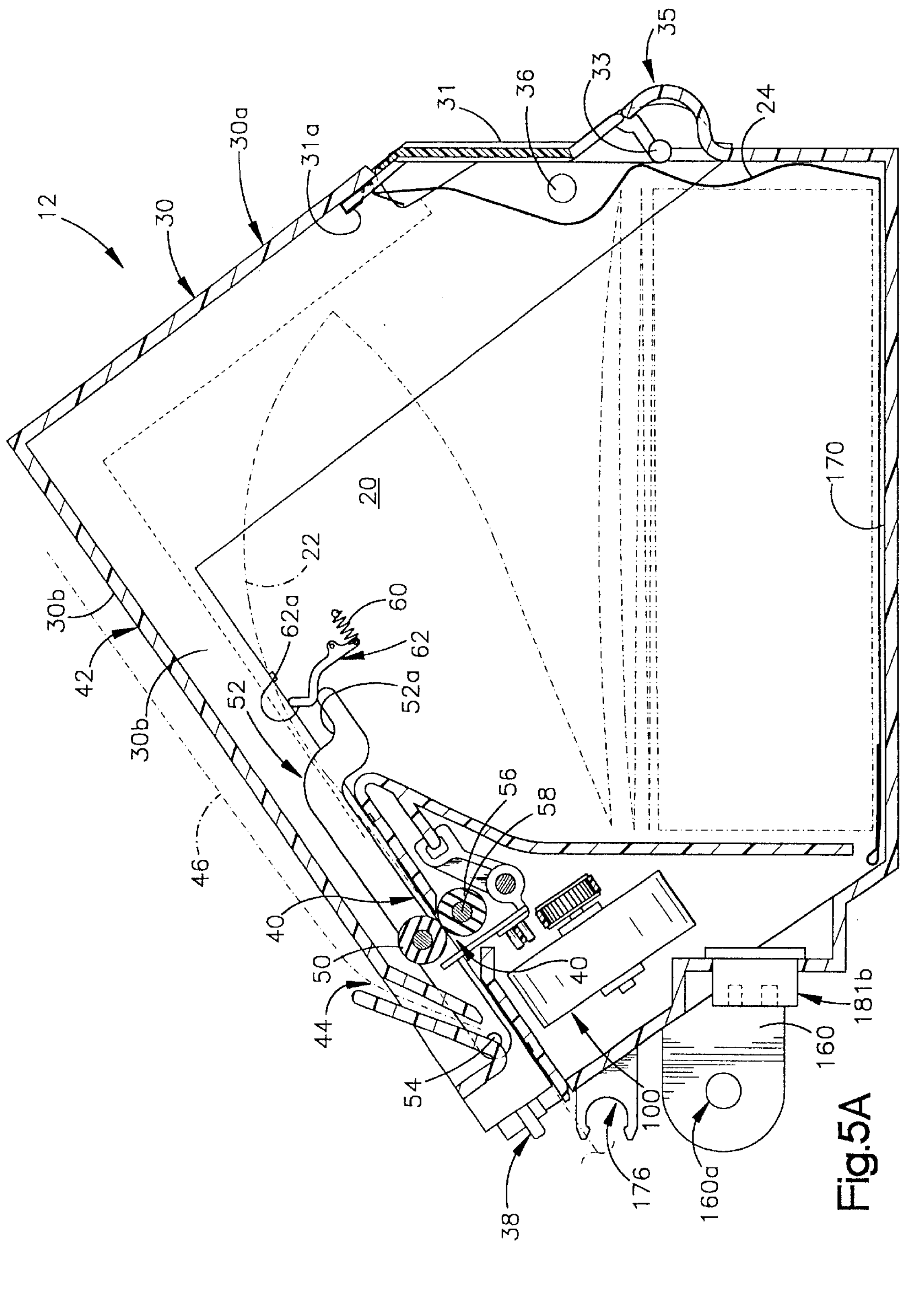
FIGS. 5A and 5B are elevational views of the feeder module which forms part of the printing system.
Figure 5B:
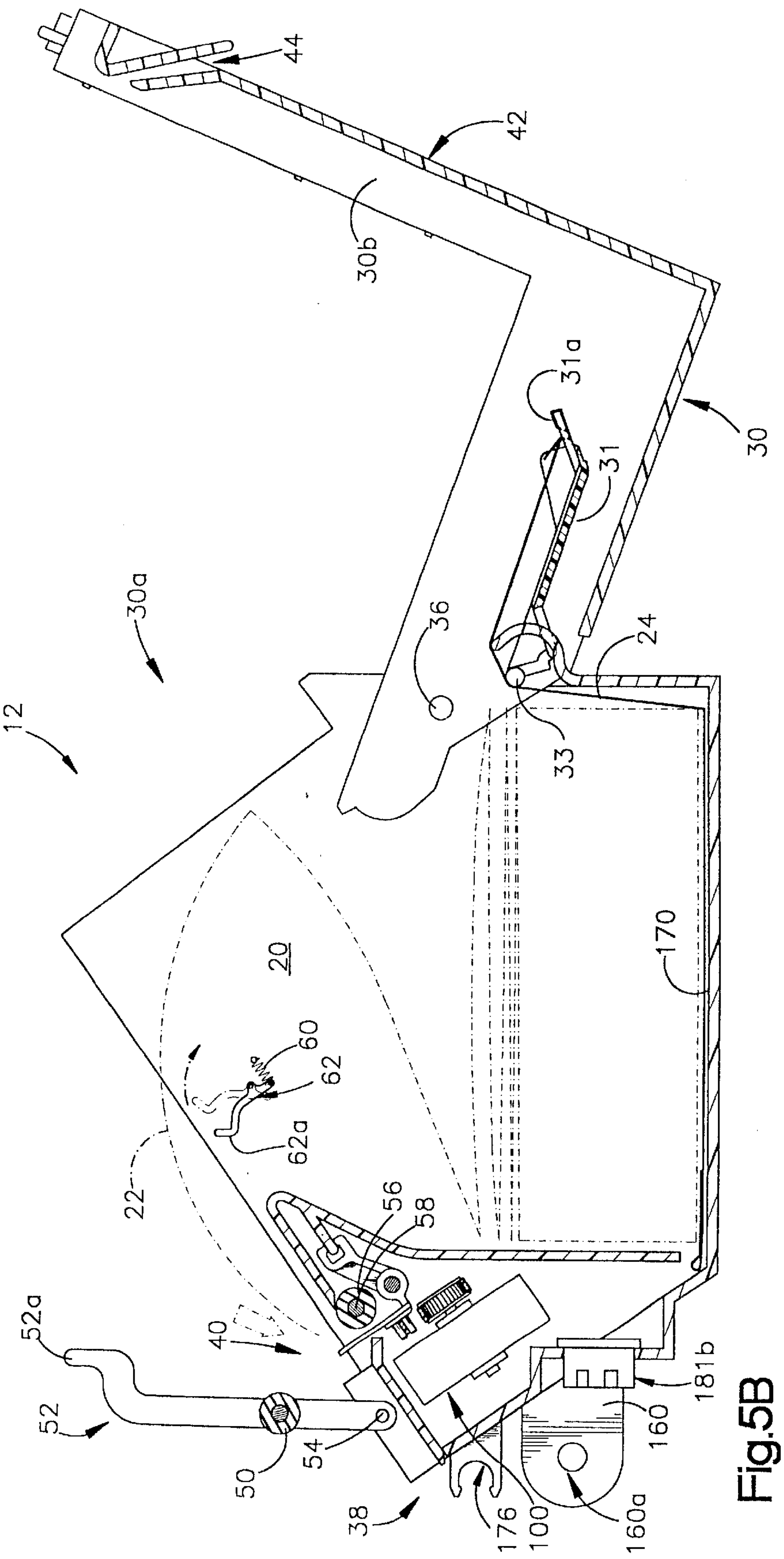

Turning first to the feeder module 12 and referring also to FIGS. 5A and 5B, the feeder module includes a compartment 20 for storing a plurality of blank money order forms 22 in a continuous fanfold arrangement 26. Arrangement 26 will be described more completely with reference to FIG. 7. A pull ribbon 24 is provided to facilitate removal of the blank money order forms 22 from the storage compartment 20 should that be necessary. An L-shaped cover or lid 30 encloses the interior and the storage compartment 20 of the feeder 12. The lid 30 pivots about an axis designated by the reference character 36. When the lid 30 is in the closed position illustrated in FIG. 2 and the feeder 12 is coupled to the printing module 10, one or more projecting tabs 38 extend into corresponding slots formed in the printing module and prevent opening of the lid 30 when the feeder 12 is attached to the printing module.

Preferably, the feed module 12 includes an auxiliary door 31 to further facilitate access to the storage compartment 20. The auxiliary door 31 rotates about a pivot 33 and is supported for pivotal movement by a hinged structure indicated generally by the reference character 35. The auxiliary cover 31 includes a locking extension 31*a* which is engaged by the underside of the L-shaped cover 30. With the disclosed arrangement, the auxiliary door 31 can only be opened when the main, L-shaped door 30 is opened, as seen in FIG. 5B.

Referring also to FIG. 1, the lid 30 includes a rear support portion 30*a* and a transversely extending tray portion 30*b*. The tray portion 30*b* serves two functions. Firstly, the tray portion 30*b* covers and prevents access to a first feed mechanism designated by the reference character 40. Secondly, portion 30*b* defines an external feed tray 42,by which external print medium 46, shown in FIG. 2, such as log sheets, etc. can be directed towards a printing location or printing station 10*a* (shown best in FIG. 3) located within the printing module 10, whereby historical use and accounting information can be printed. A slot 44 is provided through which the external print medium 46 can be inserted. To facilitate alignment, a longitudinal rib 48 is formed on one side of the external feed tray 42 against which the external print medium 46 can be held for alignment purposes as it is inserted into the slot 44. Although media 46 is referred to as print media, some applications may use the system of the present invention to read indicia or symbology from material using an optical or other sensor (to be described) mounted on the printhead without printing anything on the media.

The first feed mechanism 40 advances the money order form 22 from the storage compartment 20, towards the printing station 10a shown in FIG. 3. As seen best in FIG. 3, the first feed mechanism 40 includes a pinch roll unit that comprises a pressure roller 50 and a driven feed roller 56. The pressure roller 50 is carried by a support frame defined in part by a pair of outboard support arms 52 (only one arm is shown). The support arms 52 and hence, the frame pivot about a common axis 54 (see FIG. 5B). The arms 52 are pivoted upwardly about the pivot 54 in order to separate the pressure roller 50 from the driven feed roller 56 which rotates about a axis 58 fixed with respect to the feeder 12.

At least one, but preferably both, of the support arms 52 includes a L-shaped extension 52*a* which is engageable by a spring-loaded lever 62 shown in FIGS. 3 and 5A. The lever 62 includes a curved or slanted engagement surface 62*a* which is used to cam the lever 62 outwardly as the support arm 52 moves into an operative position at which the rollers 50, 56 are in the pinching position. When the extension 52*a* of the support arm 52 reaches the operative position, the upper surface of the extension engages a downwardly facing surface of the lever 62. This engagement maintains the support arm 52 in its pressure-applying position and applies a biasing force to the pressure feed roller 50 which is a function of a lever spring 60.

Referring to FIG. 5B, the support arms 52 pivot to a nonoperative position by spacing the pressure roller 50 from the feed roller 56 during loading of the print medium material which may comprise, for example, blank money order stock. After the lead money order 22 is placed on top of the driven roller 56, the arms 52 are pivoted downwardly so that the pressure roller 50 clamps or pinches the lead money order between itself and the driven roller 56.

Referring also to FIG. 2, the driven roller 56 includes a drive gear 66 at its outboard end which is coupled via a clutch gear 70*a* and a series of intermediate and idler gears (to be described) with a main drive motor 80. According to one embodiment, the main drive motor 80 is located within the printing module 10 and may comprise, for example, a stepper motor 80.

Figure 7:
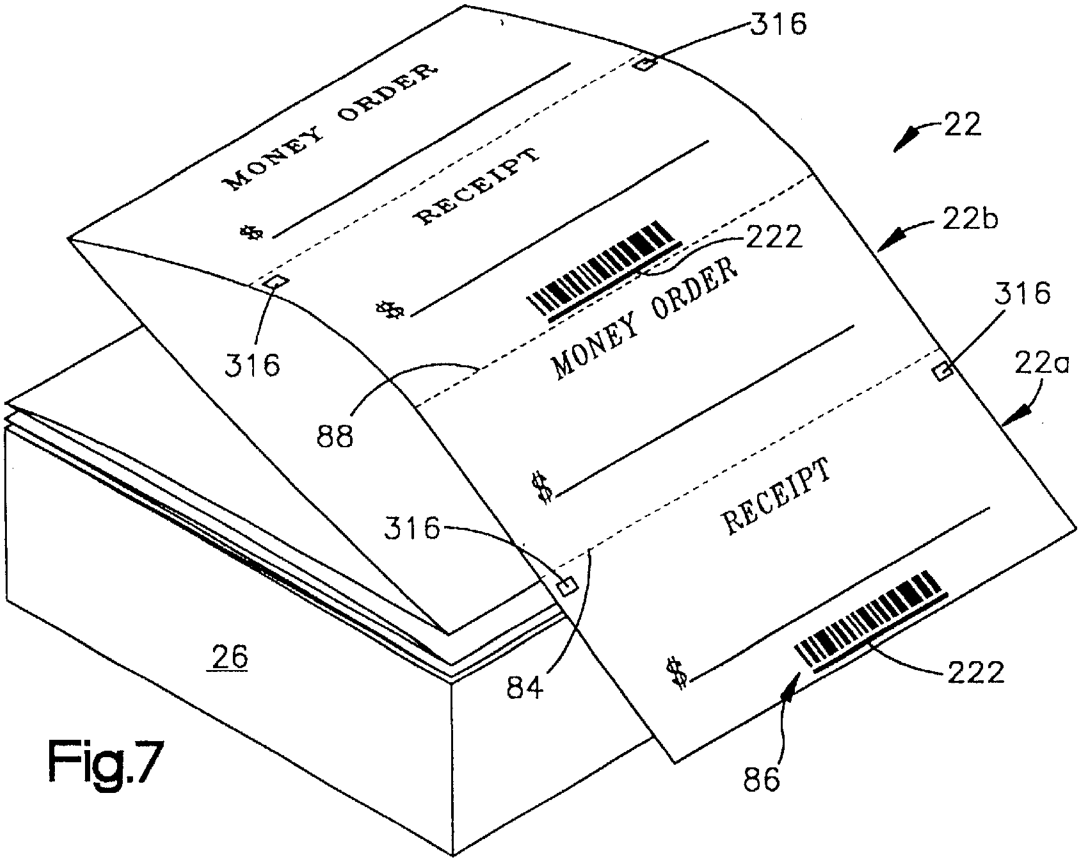
FIG. 7 illustrates the construction and format of a continuous form that comprises a chain of interconnected money orders that may be used with the present invention.

When the printer assembly 9 is used in a money order generating and dispensing application, the blank money order stock 26 may comprise a series of interconnected, money order forms 22. FIG. 7 illustrates a money order form 22 which may be used with printer 9. According to one embodiment, each individual money order 22 may include a receipt portion 22*a* and a negotiable instrument portion 22*b*. The two portions may be interconnected by a line of weakness such as perforations 84 to facilitate separation. Both the receipt portion 22*a* and the negotiable instrument portion 22*b* are printed by printer 9 in a direction which is transverse to the direction of paper movement, with the receipt portion comprising the lead portion of the money order form 22 so that it is advanced into the printing location 10*a* first. Each money order form 22 may also include indicia 86 which may comprise, for example, a UPC bar code list. Indicia 86 may include information, such as a money order number list, agent identification information, check sum information, batch numbers or other inventory control information.

Figure 4:
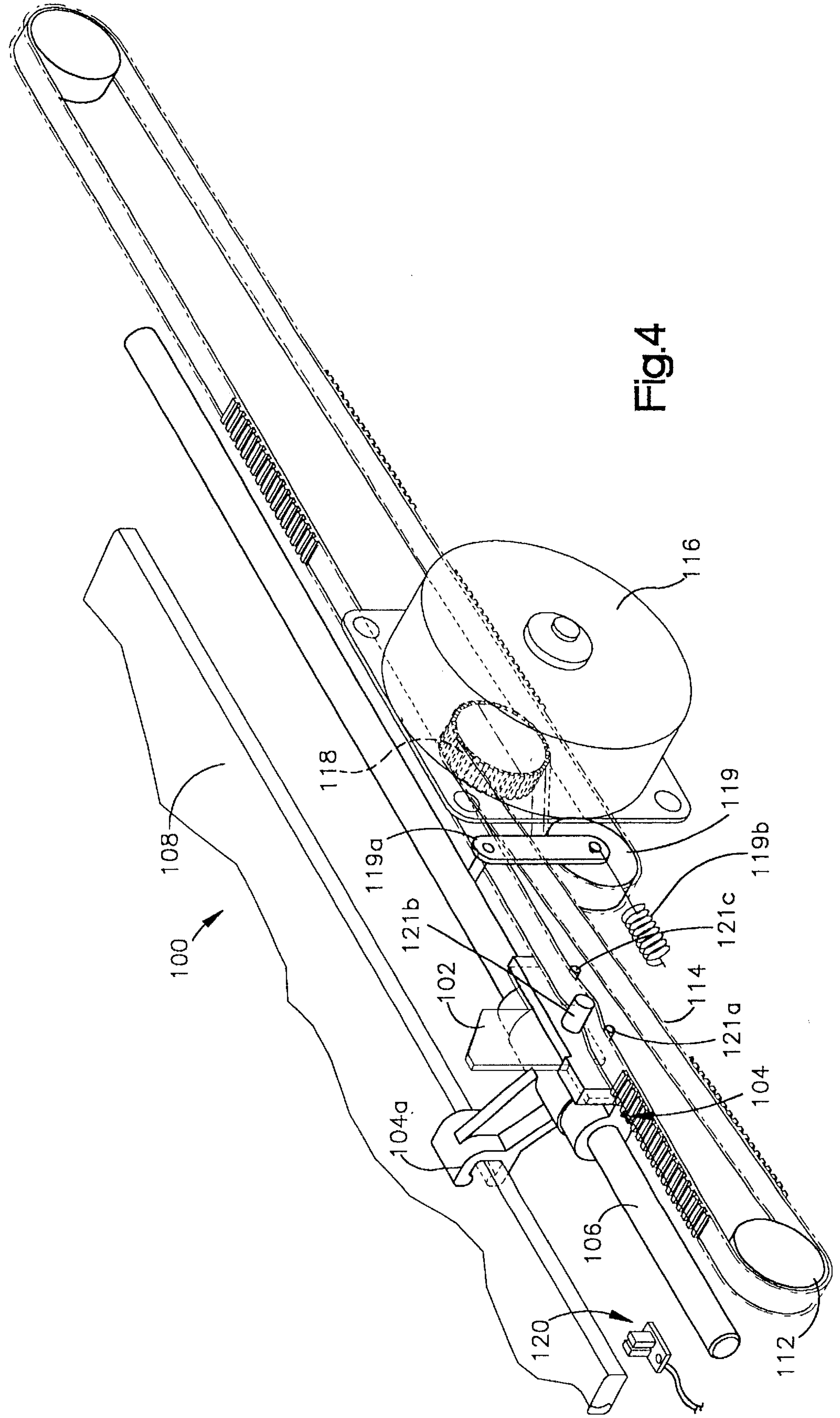
FIG. 4 is a perspective view of a burster mechanism constructed in accordance with one embodiment of the invention.

The feeder module 12 includes a severing mechanism such as a burster 100 (shown best in FIG. 4) for severing the lead money order 22 from the rest of the stock 26 as the lead money order 22 is advanced to the printing station 10*a*. In the preferred embodiment, the burster includes a knife-like blade 102 which moves transversely with respect to the paper path and severs the lead money order 22 from the rest of the money order stock 26. Preferably, the blade 102 moves along a line of perforations 88 preformed in the money order stock 26. It will be understood that a cutter could be used in place of the burster 100 for applications of the present invention using print media that does not include preformed perforations.

The burster blade 102 extends upwardly into the paper path from a carriage 104. The carriage 104 is mounted for reciprocating movement on a main support shaft 106. The carriage 104 also includes a claw-like member 104*a* that engages and is supported for transverse sliding movement by a support tongue 108 shown in FIGS. 2 and 3. As may be seen in FIG. 4, the carriage 104 is driven back and forth along the main shaft 106 by a belt drive formed by a pair of outboard belt pulleys 112 around which a timing belt 114 is reeved. The belt 114 itself is driven by a stepper motor 116 directly connected to a drive pulley 118 around which the drive belt 114 is partially reeved. The partial wrap around the drive pulley 118 is maintained by a spring loaded idler pulley 119 carried by a pivotally mounted, spring loaded lever 119*a*. A coil spring 119*b* provides the necessary biasing force. According to one embodiment of the present invention, the timing belt 114 is a continuous belt and is releasably coupled to the carriage 104 by a series of pins 121 which releasably capture the belt 114.

The burster mechanism lo also includes a home burst sensor 120 to detect the home position of the carriage 104 and burster blade 102. Prior to a bursting sequence, the stepper motor 116 is activated to drive the carriage 104 towards the left shown in FIG. 4, until the home burst sensor 120 detects the presence of the carriage 104. When the carriage 104 is detected, the control logic for the stepper motor 116 is reset. When bursting is desired, the stepper motor 116 is activated to advance the burster carriage 104 to the opposite or right end, as viewed in FIG. 4, of the main support shaft 106. By using the stepper motor 116, the burster carriage 104 can be advanced a predetermined distance, decelerated and halted prior to striking an abutment or stop located at the opposite end of the main support shaft 106. This reduces noise and the stresses in the burster drive mechanism.

Figure 6:
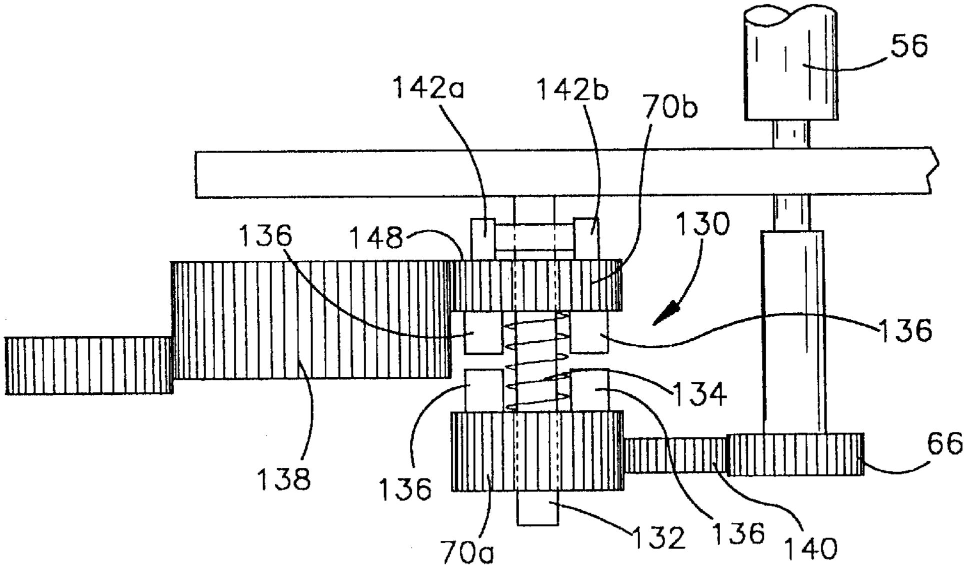
FIG. 6 illustrates a clutch mechanism constructed in accordance with one embodiment of the invention.

Referring also to FIG. 6, a clutch gear assembly 130 controls whether the first feed mechanism 40 in the feeder 12 is drivingly connected to drive the paper drive motor 80 located in the printing module 10. As seen in FIG. 6, the clutch gear assembly 130 comprises a pair of confronting clutch gears 70*a*, 70*b* supported on a common shaft 132 and urged into a spaced apart position by a biasing spring 134. Each clutch gear 70*a*, 70*b* includes three coupling teeth 136 that mesh when the clutch gears are moved into driving engagement.

Figure 12:
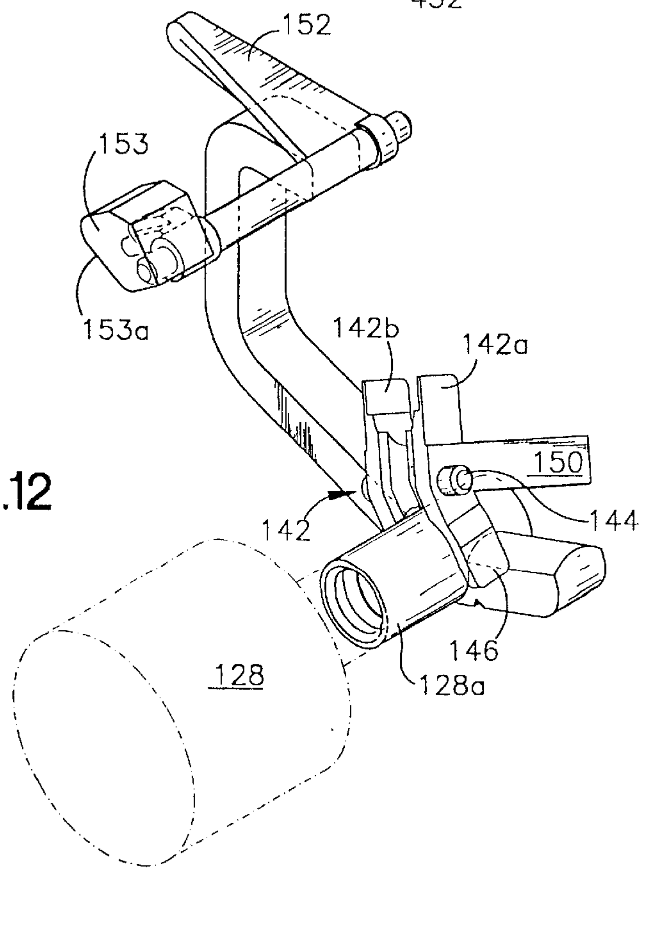

A paper feed clutch solenoid 128 shown in FIG. 12, is used to drive the inner clutch gear 70*b* into driving engagement with the outer clutch gear 70*a* to couple the feeder drive mechanism 40 to the main drive motor 80. As seen in FIG. 6, the inner clutch gear 70*b* is in constant mesh with a printer/feeder interface idler gear 138 while the outer clutch gear 70*a* is in constant mesh with a another idler gear 140 which is in co-meshing engagement with the drive roller gear 66 shown in FIG. 2. Movement of the solenoid 128 is coupled to the inner clutch gear by a linkage 142 shown in FIGS. 6, 12 and 13. The linkage 142 comprises a pair of interconnected vertical link arms 142*a*, 142*b* that pivot about a central pivot 144 shown in, FIG. 12. The solenoid 128 is operatively connected to a lower pivot 146 located between the link arms 142*a*, 142*b*. The upper ends of the link arms 142*a*, 142*b* abut an inside surface 148 shown in FIG. 6 of the inner clutch gear 70*b*. When the solenoid 128 is energized, the upper ends of the link arms 142a, 142*b* move downwardly, (as viewed in FIG. 6), pushing the inner clutch gear 70*b* into driving engagement with the outer clutch gear 70*a*. Thus, the clutch teeth 136 are coupled such that rotation in the interface gear 138 produces rotation in the drive roller gear 66 via the idler gear 140.

Figure 11A:
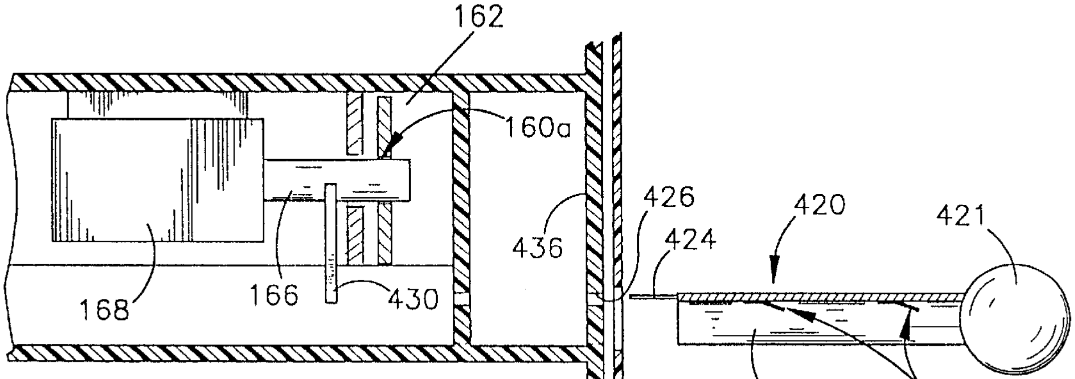
FIGS. 11*a* and 11*b* are fragmentary, sectional views showing a one time, unlocking feature forming part of one embodiment of the invention.
Figure 11B:
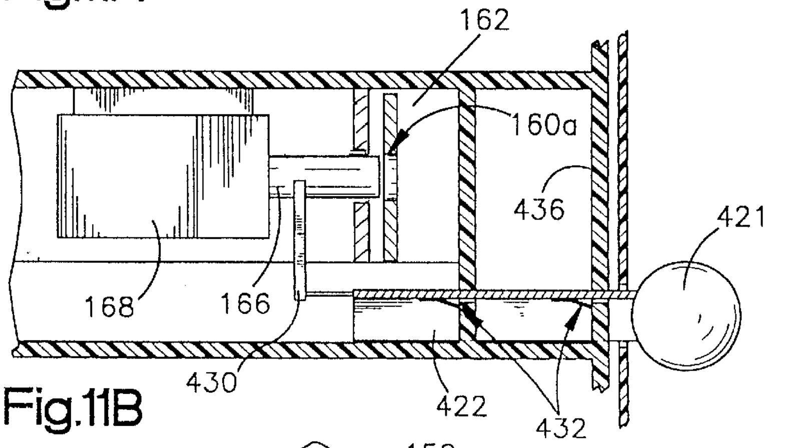

Referring to FIGS. 3, 5A and 5B, a locking tongue 160 extends transversely from the feeder 12 and is arranged to enter a complementally shaped slot 162 formed in the printing module 10. Referring also to FIGS. 11A and 11B, the tongue 160 includes a through hole or slot 160*a* through which pin 166, actuated by a solenoid 168 located in the printing unit, extends in order to lock the feeder 12 to the printing module 10. According to one embodiment, the pin 166 is tapered and arranged such that as the tongue 160 moves into the slot 162, the tongue 160 displaces the pin 166 sideways, until the hole 160*a* is aligned with the pin 166 whereupon the pin 166 can enter and engage the tongue 160, thereby preventing removal. This eliminates the necessity of actuating the solenoid 168 in order to install the feeder 12 onto the printing module 10. To achieve this feature, the pin 166 is spring-loaded towards engagement with the tongue 160 and is retracted from the tongue 160 by actuation of the solenoid 168.

Referring to FIG. 2, to facilitate installation of the feeder 12 onto the printing module 10, the printer module 10 includes a horizontal shelf 170, which supports the feeder 12 in vertical alignment with the printing module 10. In addition, side supports or wings 171 are used to establish the side-to-side alignment of the feeder 12 with the printing module 10. The wings 171 together with the shelf 170 create a docking station that allows for easy alignment and coupling of the feeder 12 to the printing module 10.

In the illustrated embodiment, the feeder 12 includes a pair of transversely extending, snap arms 176 shown in FIGS. 2 and 5A which locate the feeder 12 relative the printing module 10 by releasably engaging a feeder drive roller bearing 178. This feature provides a means for providing a detented engagement between the feeder 12 and the printing module 10. Referring to FIGS. 3 and 5B, an electrical connector 180 communicates the necessary power and control signals between the printing module 10 and the feeder 12. The connector 180 comprises a portion 181*a* mounted to the printing module 10 and a complementally-shaped portion 181*b* mounted to the feeder 12 such that as the feeder 12 is installed onto the printing module 10, the two connector portions engage to electrically couple the conductors in the printer module 10 to the conductors in the feeder 12. In addition, the interface/idler gear 138 forming part of the feeder 12, couples to a printer drive roller gear 184, shown in FIG. 4, when the feeder 12 is installed onto the printing module 10.

The printing module 10 includes a printing mechanism 200 having a printing member for printing material onto the blank money order form. According to one embodiment, the printing member comprises a dot matrix printhead 204 carried by a printhead carriage 202 that in turn is mounted for reciprocating, transverse motion with respect to the paper path. The dot matrix printhead carriage 202 is supported by a transverse support shaft 206 and a guide bar 203 slidably engaged by a claw-like portion 202*a* of the printhead carriage 202. Transverse motion of the printhead 204 along the support shaft 206 may be effected by a motor and a drive belt mechanism similar to that provided for the bursting mechanism 100 shown in FIG. 4. The drive motor may comprise a stepper motor like that for the burster assembly so that precise movement of the printhead 204 can be controlled. Although the printhead 204 is constructed to move transversely relative to the paper path, the actual printing may be oriented transversely, transversely and inverted, or longitudinally relative to the paper path depending on the print orientation required for a particular instrument or application.

The construction and the function of the printing portions of the dot matrix printhead 204 to print indicia is similar, if not identical, to the construction and function of printheads commercially available from DH Technology, Inc. In particular, the illustrated dot matrix printhead 204 is similar to a Model 350 dot matrix printhead currently available from DH Technology, Inc. and includes a plurality of print wires 205 which may be arranged in an aligned or in a staggered array. To print a character on the print medium, the printhead 204 is advanced to the position at which the character is to be printed and certain of the wires are actuated and moved towards the print medium. A ribbon is located between the print wires and the print medium and transfers ink to the print medium in the region of the ribbon struck by the print wires.

It should be understood that the present invention is not limited to the type of printhead disclosed. The invention is adaptable to a wide variety of printing members including daisy wheel printheads and ink jet printheads.

Figure 8:
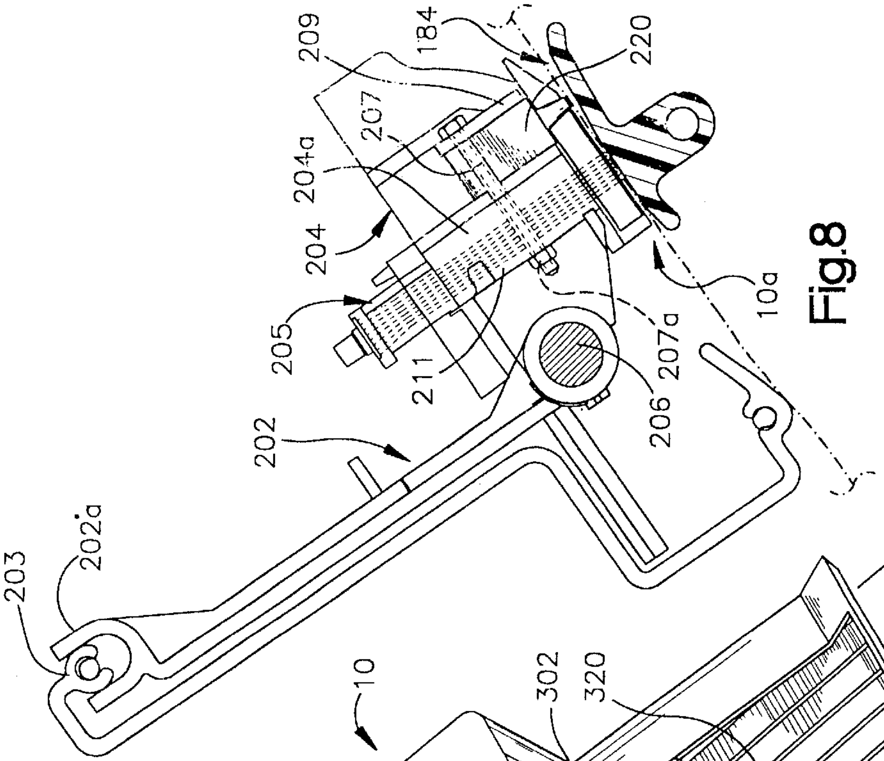
FIG. 8 is a fragmentary, sectional view showing the construction of a printhead assembly including a bar code sensor carried by the printhead.

According to a feature of the invention, the printhead 204 provides a second function in addition to the printing function. According to the invention, a sensor 220 is mounted to the printhead 204 and in particular, may be mounted directly to the top of the printhead, as shown best in FIG. 8. The Model 350 printhead identified above, may be utilized in the disclosed printing apparatus if desired. Slight modifications to the Model 350 printhead may be required in order to accept the sensor 220. Referring to FIG. 8, in the preferred embodiment, the sensor 220 is clamped to the printhead 204 and, in particular, is clamped to the top of a printhead surface 204*a*, under which the print wires extend, by a pair of elongate bolts 207 which extend through a pair of holes formed in the sensor 220 and a complementally located pair of holes in the printhead 204. A clamping plate 209 is disposed between the bolt heads and the sensor 220 in order to distribute the clamping forces. In the preferred embodiment, the bolts 207 also serve to mount the printhead 204 to the carriage 202. The bolts extend through holes formed in the sensor 220, as well as holes in the printhead 204 and into threaded members 207*a* which may form part of a carriage mounting surface 211. The bolts clamp the sensor 220 and printhead 204 to the carriage 202.

According to one embodiment, the sensor 220 performs two functions. Sensor 220 detects either the actual leading edge of, or a top of form mark 222 preprinted on the form, as the form is advanced towards the printing position. In addition, the sensor 220 is operative to read a bar code 86 (or other document identifying/verifying indicia) preprinted on the print medium which may comprise, for example, money order stock as discussed previously. According to one embodiment, the sensor 220 detects a top of form mark 222 as opposed to the leading edge of the money order. In the illustrated application, the "top of form" mark 222 may be referred to as an "under bar" because it is located below the bar code 86.

The sensor 220 is also used to detect an out of paper condition for the forms 26 and end of paper condition for external print medium. An end of paper condition is detected by sensing the trailing edge of the paper being printed. An out of paper condition is detected by driving all the feed rollers for a predetermined period of time without detecting a leading edge of the next form, a top of form mark 222 or an indicia 86.

It should be understood that the sensor 220 may be used with other types of printing members, such as daisy wheel print mechanisms, ink jet print mechanisms, etc. The present invention should not be limited to systems utilizing dot matrix printheads.

The printing module 10 includes an input feed mechanism 224 for advancing a money order form through the printing station 10*a*. In particular, a pinch roll assembly 224 is located at an input end of the printing module 10. The pinch roll assembly 224 includes a pressure roller 226 and an associated driven roller 228. The outboard end, shown in FIG. 2, of the driven roller 228 includes the drive gear 184. An output pinch roll assembly 240 is located downstream of the printing station 10*a* and it ejects the printed money order from the printing module 10. Output pinch roll assembly 240 comprises a pressure roller 242 and a driven roller 244. The outboard end of the driven roller 244 includes a drive gear 246.

The input and output drive rollers 228 and 244 are co-driven by a large, common idler gear 250. The idler gear 250 is driven by the paper drive stepper motor 80 through a cluster gear 252. As seen in FIG. 2, the drive motor 80 includes an output gear 251 which is in meshing engagement with a large gear portion 252*a* of a cluster gear 252. A smaller diameter gear portion 252*b* forming part of the cluster gear 252 is in turn in meshing engagement with the idler gear 250. As indicated above, the paper drive motor 80 is coupled to the feeder mechanism via interface gear 138 which meshingly engages the drive gear 184 of the input drive roller 228 when the feeder is coupled to the printing unit. The interface gear 138 rotates whenever the stepper motor 80 is energized. The feeder drive roller 56, however, rotates only when the clutch gears 70*a*, 70*b* are coupled. With the clutch gears 70*a*, 70*b* coupled, motion in the interface gear 138 is transferred to the feed roller 56 via idler gear 140 and feed roller gear 66.

In operation, the lead money order form is advanced from the feeder into the nip of the first print station feed roll assembly 224 by the feeder pinch roll assembly 40. The form is then advanced by both the feeder feed roll mechanism 40 and the printing station mechanism 224 until the sensor 220 detects a top of form mark 222 on the form or alternatively detects the indicia 86 or detects the leading edge of the form. In the illustrated application, the sensor 220 detects the "under bar" 222. The form is then advanced until the indicia 86 is positioned in alignment with the sensor 220. The paper drive mechanism halts the movement of the money order and the printhead drive is activated to move the printhead 204 transversely with respect to the print medium in order to read the bar code. The information read from the indicia 86 is ultimately sent to a local system 256 which is shown schematically in FIG. 9 for verification through an interface which may comprise, for example, an RS232 port. If verification is successful, the receipt portion 22*a* and the negotiable instrument portion 22*b* of the money order are printed and the printed form is severed by the bursting mechanism 100 from the rest of the supply of forms. Severance may occur prior to the complete printing of the money order. If the printed or partially printed form is severed prior to completion of the money order, the feed roll assemblies 224 and 240 forming part of the printing station 10*a* are used to advance the money order during the printing process and to ultimately eject the completed money order (including receipt) from the printing module.

Figure 9:
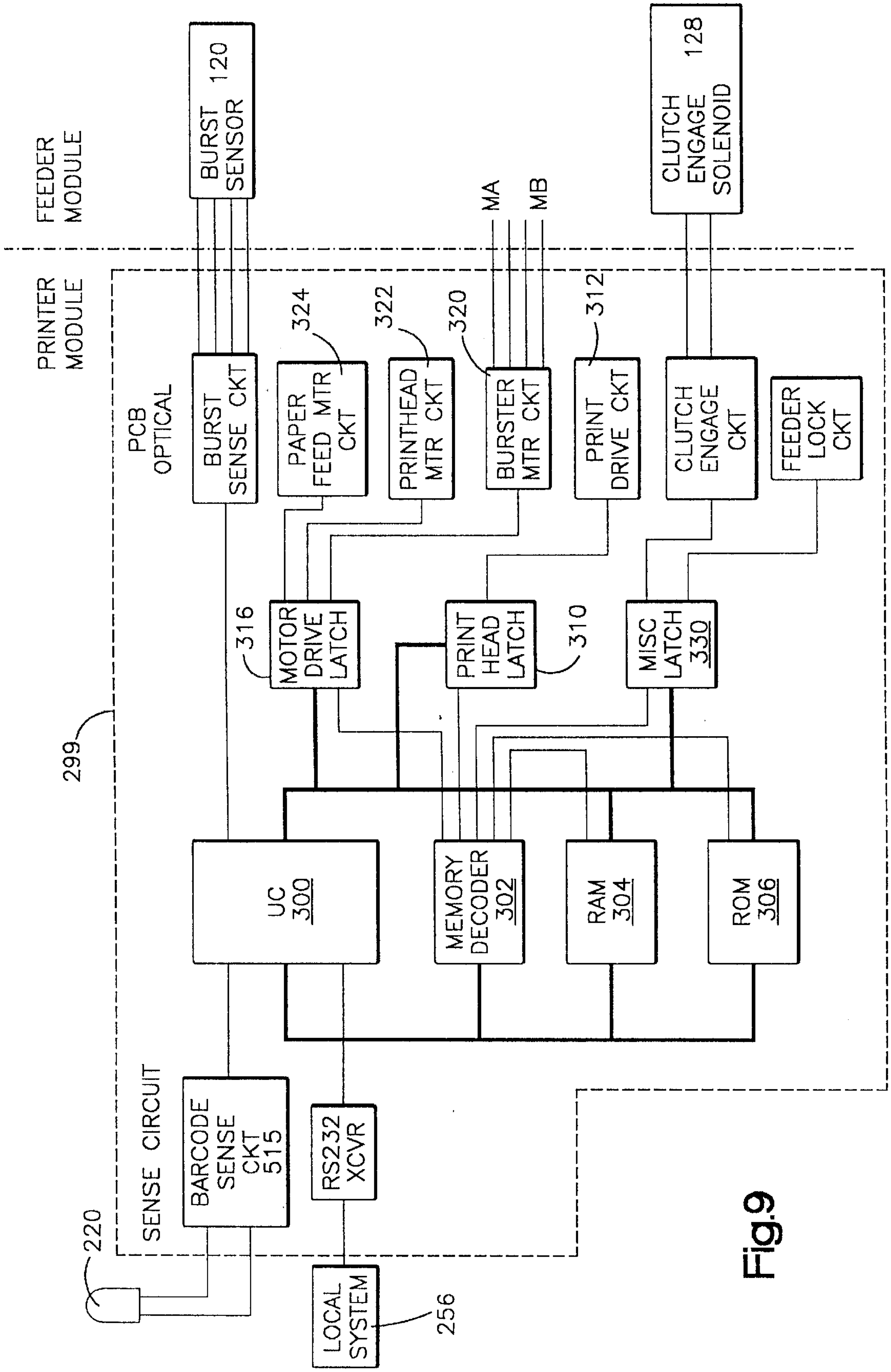
FIG. 9 is a schematic diagram of the electronics for controlling the various functions in the printing system.

Referring to FIG. 9, a block diagram of the electronics for controlling the functions of the printer assembly are shown. A controller 299 includes a microcontroller 300 which may comprise an Intel 8098 microcontroller. Controller 299 further comprises a memory decoder 302, RAM 304 and ROM 306. The ROM 306 stores software routines for performing and controlling functions within the printer module 10. For example, the software routine for causing the printhead to print in characters on the money order form as well as the routine for causing the printhead to move across the print medium in order for the sensor 220 to read the indicia 86 are all stored in ROM 306. It should be understood, however, that these functions could be controlled by the local system 256. By storing the software in ROM 306 in the unit itself, certain printing functions and bar code reading functions can be performed more efficiently and in addition may be performed by the unit even when not connected to a local system 256. RAM 204 provides working memory for microcontroller 300. RAM 304 and ROM 306 are addressed and accessed by microcontroller 300 using memory decoder 302.

Circuitry for actually firing the print wires of the printhead is provided in the form of a printhead latch 310 (which determines which wires will be fired) and a print wire drive circuit 312 for communicating the signals to the printhead solenoids to fire the print wires. A motor drive latch circuit 316 is also provided which is coupled to motor drive electronics 320, 322, 324 for the burster stepper motor 116, the printhead drive motor (not shown) and the paper feed motor 80, respectively.

The microcontroller 300 is also coupled to the home sensor 120 for the burster mechanism, as well as a bar code sense circuit 315 connected to and controlling the sensor 220. A miscellaneous latch circuit 330 is provided for controlling the clutch gear solenoid 128 and the feeder lock solenoid 168.

Circuitry is also provided to detect if the feeder 12 is attached to the printer module 10. This facilitates initialization sequences of the printing system. The system detects the presence of the feeder 12 by monitoring the electrical connection 180. When the respective connection portions **181*a* and 181*b* are connected, the presence of the feeder module 12** is detected or signaled.

An important technical advantage of the present invention is that it provides a compact and secure printing assembly for printing negotiable instruments such as money orders. In addition, the present invention provides systems for reading information pre-printed on the money order form which may comprise, as discussed, a bar code or other suitable indicia. This feature allows the system 256 to confirm and verify that a money order form in proper sequence is being printed and to exercise even more control on the printing functions of the unit as compared to prior art devices.

According to one embodiment of the present invention, unauthorized removal of the lead money order while the lead money order is still connected to the money order supply is inhibited. This feature may e accomplished in at least two different ways. According to one embodiment, an interlocking cover arrangement is used to restrict access to the paper path while the lead money order is still connected to the money order supply. This embodiment is illustrated in FIGS. 2 and 3.

Access to the interior of the printing module 10 is controlled by a pair of pivotally mounted covers 300 and 302. The cover 300 is L-shaped and pivots about an axis 304. Cover 300 includes structure indicated generally by the reference character 306 at its opposite end, which interconnects with the feeder module 12 when installed, which prevents opening of the cover 300 when the feeder 12 is mounted to the printing.module 10. The printer cover 300, when opened, provides access to the printhead hardware and the ribbon supply.

The second cover 302 provides access to the output end of the printer module 10. Cover 302 is L-shaped and pivots about an axis 310. The upper end of the cover 302 includes structure 312 that is engageable with the cover 300 and which maintains closure of the cover 302 whenever the cover 300 is closed. In order to open the cover 302, the cover 300 must be opened first which, as explained above, can only occur when the feeder module 12 is decoupled from the printing module. As a result, access to the printing module paper path is, in effect, controlled by the locking solenoid 168 since the solenoid 168 has to be energized in order to release the feeder 12 from the printing module 10.

In operation, the lead money order 22 may be severed prior to reaching a point along the paper path at which its leading edge is visible or accessible, i.e., prior to the time it reaches the pivot axis 310 for the front cover 302. According to one embodiment of the present invention, once the lead money order 22 reaches the position at which its leading edge may be gripped and pulled, the lead money order is already severed from the money order supply and, thus, pulling the lead money order 22 will not enable someone to pull the entire blank money order supply out through the exit of the printing module 10. An important technical advantage of this embodiment of the present invention is that the form being printed is not exposed or accessible unit it is burst and is detached from the remaining blank forms. In this manner, there is not way an unauthorized party can extract blank forms by pulling on the form being printed.

According to one possible mode of operation, the lead money order 22 is severed from the supply after the receipt portion **22*a* has been printed, but prior to printing the money order portion 22*b*. In operation, and referring also to FIG. 2, the lead money order 22*a* is advanced, as described above, to a position at which the top of form mark 222 is detected. The money order is then advanced until the indicia 86 is in alignment with the sensor 220, whereupon the indicia 86 is read. Following verification by the local system 256, the receipt portion 22*a* of the lead money order 22 is printed. The lead money order 22 is then advanced until one of two auxiliary alignment marks 316 is detected by the sensor 220. Following detection of the auxiliary alignment mark 316, the lead money order 22*a* is advanced a short distance further so that the perforation 88 is aligned with the burster mechanism 100, whereupon the burster mechanism is activated to severe the lead money order 22*a*** from the supply.

Since the distance traveled from the point where the auxiliary mark 316 is detected to the burst position is short, the chances of having a line feed error is small thus reducing the possibility of missing the perforation 88 during the bursting cycle. At this point in the money order generating cycle, the leading edge of the money order is still upstream of the front cover pivot 310 and is not accessible from outside the printer module 10.

Sensor 220 also makes loading blank stock into bin 20 and feeder 12 very simple and efficient. The leading form in a new batch of forms need only be placed in contact with the feed rollers with no exact positioning necessary. The feed rollers will function to advance the blank forms until the sensor 220 detects a leading edge or top of form indication at which time the printing of the first form can proceed.

The sensor 220 may be also used to provide additional security for the system. In the preferred embodiment, an initial read step is effected whenever the feeder 12 is re-attached to the printing station. In particular, upon attachment of the feeder, i.e., after reloading the bin 20 with money order stock, the lead money order 22 is immediately.

advanced until the indicia 86 is in alignment with the sensor 220. The sensor is then used to read the indicia 86 to determine information concerning the lead money order. This information can be compared to historical information maintained by the system and a determination can then be made whether forms were removed from the money order supply or whether the money order forms were improperly installed, etc. The system may also monitor the time of day when the feeder was reinstalled, as well as, an identification of the individual who keyed in the necessary information to effect removal of the feeder. Following the scanning of the indicia 86 of the lead money order, the feed mechanism is activated to retract the money order to its starting or initial position. If the system determines that the money order supply is now out of sequence, or improperly installed, etc. it may halt further operation of the transaction printer assembly.

Following the bursting of the lead money order 22, the money order portion 22*a* is printed and ejected by the output feed roller 244. The printed money order then falls onto and is supported by an output tray indicated generally at 320. The output tray 320 is designed to hold a plurality of printed money orders.

According to one embodiment of the present invention, a deflector member 322 is positioned downstream of the feed roller 244. Deflector member 322 includes an inclined surface 322*a* which is in a confronting relationship with the nip of the feed roller 240 and deflects the money order downwardly towards the output tray.

In the preferred and illustrated embodiment, provision is made to prevent the insertion of print media 508 into the external slot 44 that forms part of the feeder cover 42. As described above, external print media, i.e., blank paper may be inserted into the feeder whereby historical and accounting information can be printed. Provision has been made, however, in the preferred embodiment, for inhibiting the insertion of paper during printing of a money order being fed from the vault or bin 20 forming part of the feeder 42.

Figure 14:
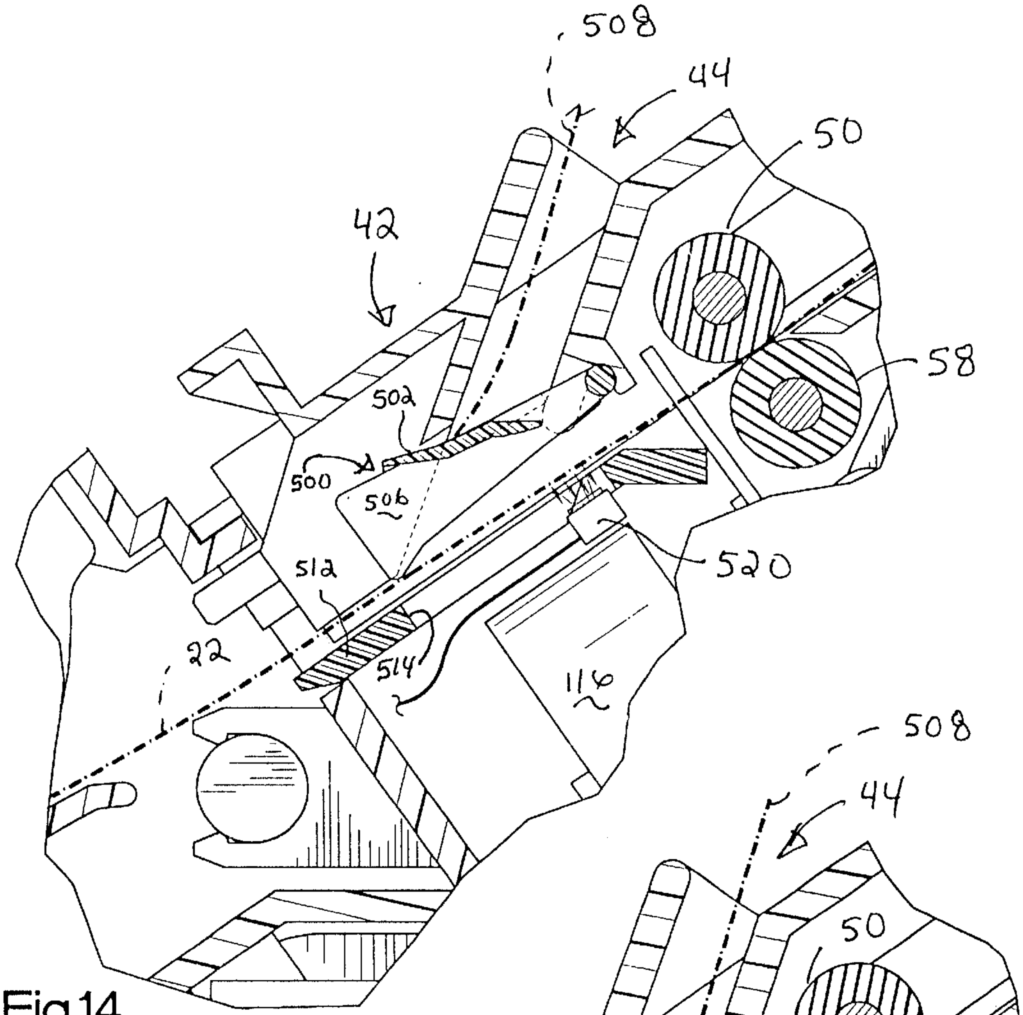
FIG. 14 is a fragmentary, sectional view of the printer system showing a gate member in a closed position.
Figure 15:
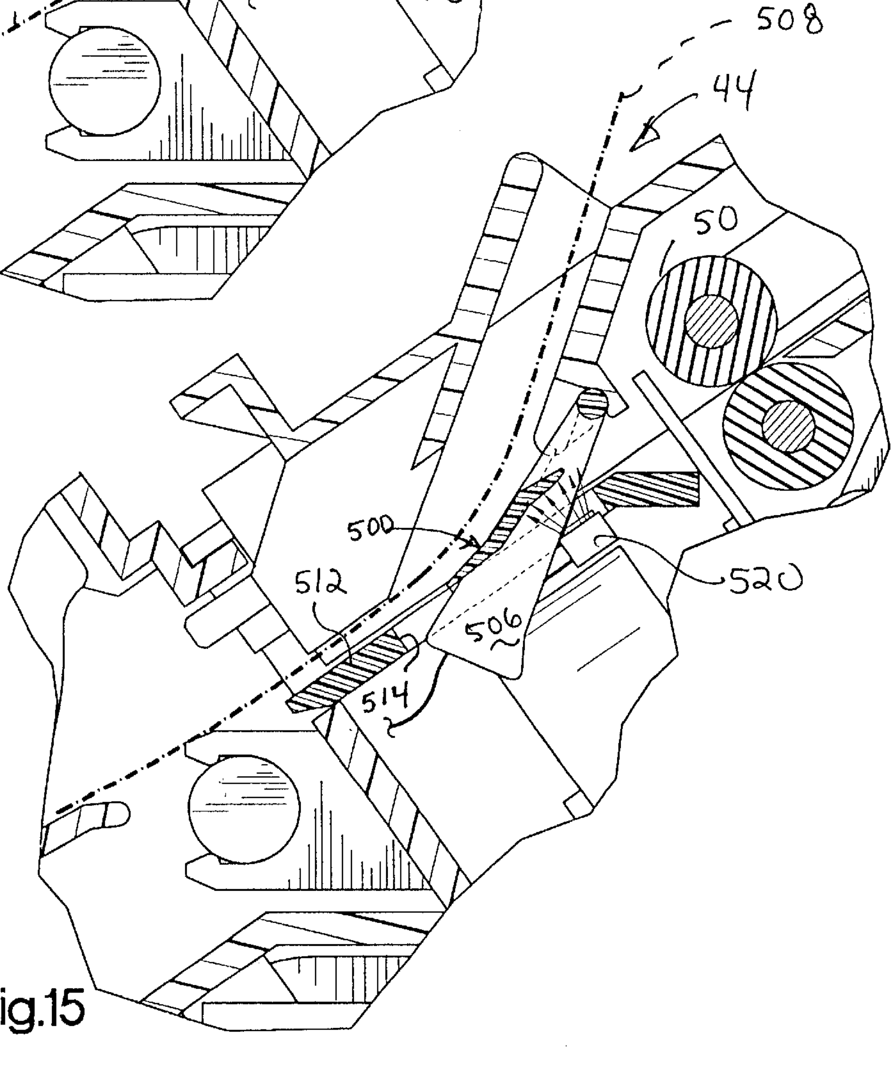
FIG. 15 is another fragmentary sectional view showing the gate mechanism in an open position which allows external print media to be inserted into the printer.

Referring in particular to FIGS. 3 and 14–16, a gate 500 is located at the base of the slot 44 which is movable between a closed position shown in FIG. 14 and an open position in FIG. 15. The gate 500, as seen best in FIG. 16, includes a deflector portion 502 interrupted by a plurality of slots 504. Depending downwardly from the deflector portion are a plurality of ribs 506. The gate 500 is pivotally supported to the feeder housing by a pair of spaced apart pin members 510. The gate 500 is mounted above a support/guide plate 512 which includes a plurality of slots 514 aligned with the ribs 506. The guide plate 512 supports print media fed from the feeder 42. When print media from the feeder is traveling towards the printing station it covers the slots 514 preventing the ribs 506 from entering the slots. Consequently the gate 500 is prevented from pivoting downwardly to its open position shown in FIG. 15. Once the money order form is severed from the paper supply and is advanced to the printing station, the slots 514 in the support plate 512 are exposed allowing the gate 500 to pivot to the open position. At this juncture, print media 508 external to the feeder can be inserted into the slot 44.

Figure 16:
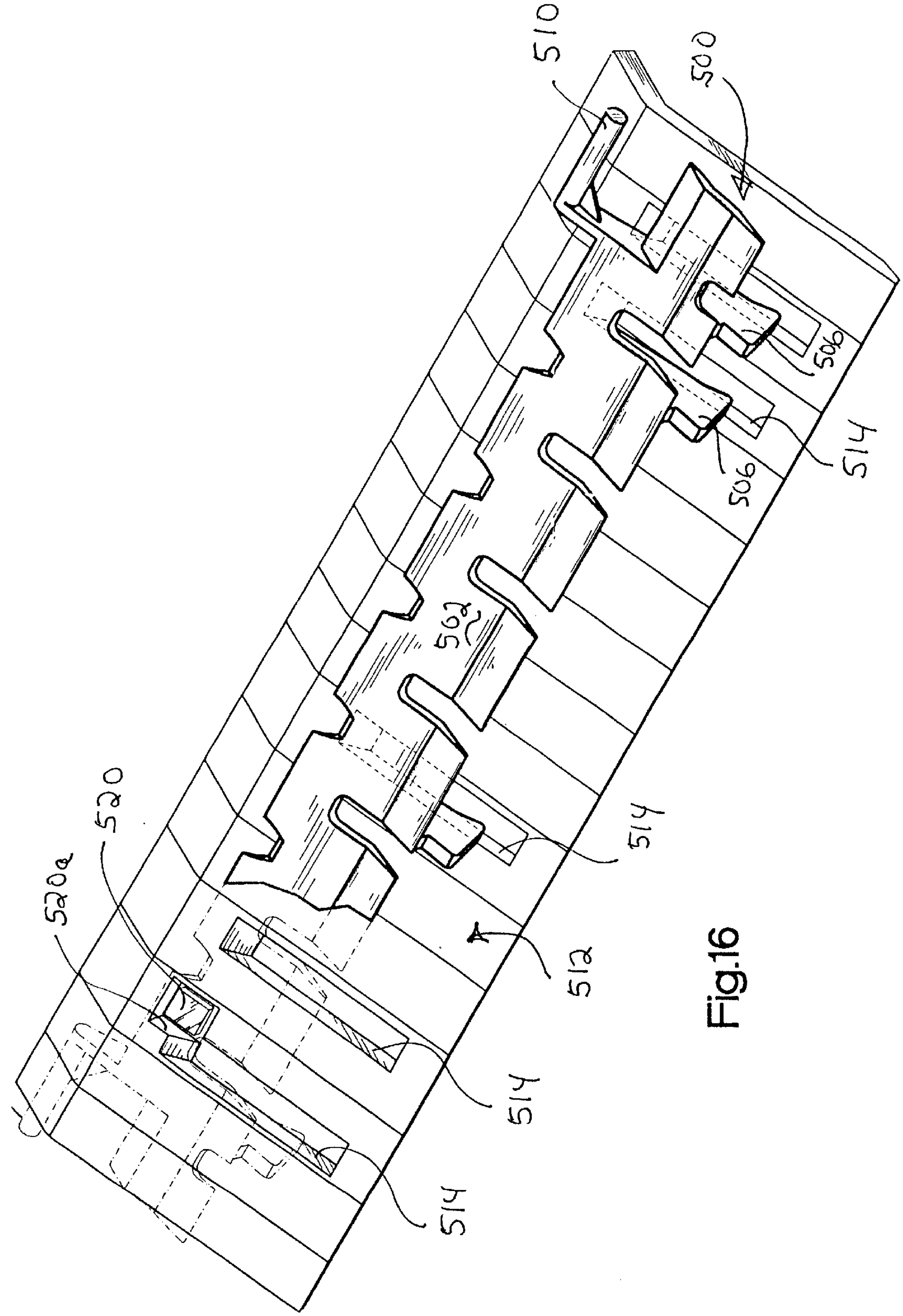
FIG. 16 is a perspective view of the gate member and associated guide member shown in FIGS. 14 and 15.

According to an additional feature of the invention, failure to burst or severe the lead money order form from the supply is detected by a burst sensor 520 shown best in FIGS. 14–16. The sensor is mounted below an opening 520*a* (see FIG. 16) in the guide plate 512 and detects the presence and absence of print media above the sensor 520. If the bursting step is successful, the lead money order will uncover the sensor 520 as it moves to the printing station. If the sensor 520 fails to detect the absence of print media after the bursting step, it is an indication that the lead money order form did not separate from the print media supply contained in the feeder 42. The control system may then take corrective action or inhibit further operation of the system. The sensor 520 is preferably a reflective-type sensor, examples of which are commercially available and are well known in the art. Other types of sensors, such as proximity, inductive, hall effect etc. sensors can be substituted.

According to another embodiment of the present invention, a mechanism is used to lock and prevent rotation of one of the rollers that comprise the feed roll assembly 40 located in the feeder 12.

Figure 13:
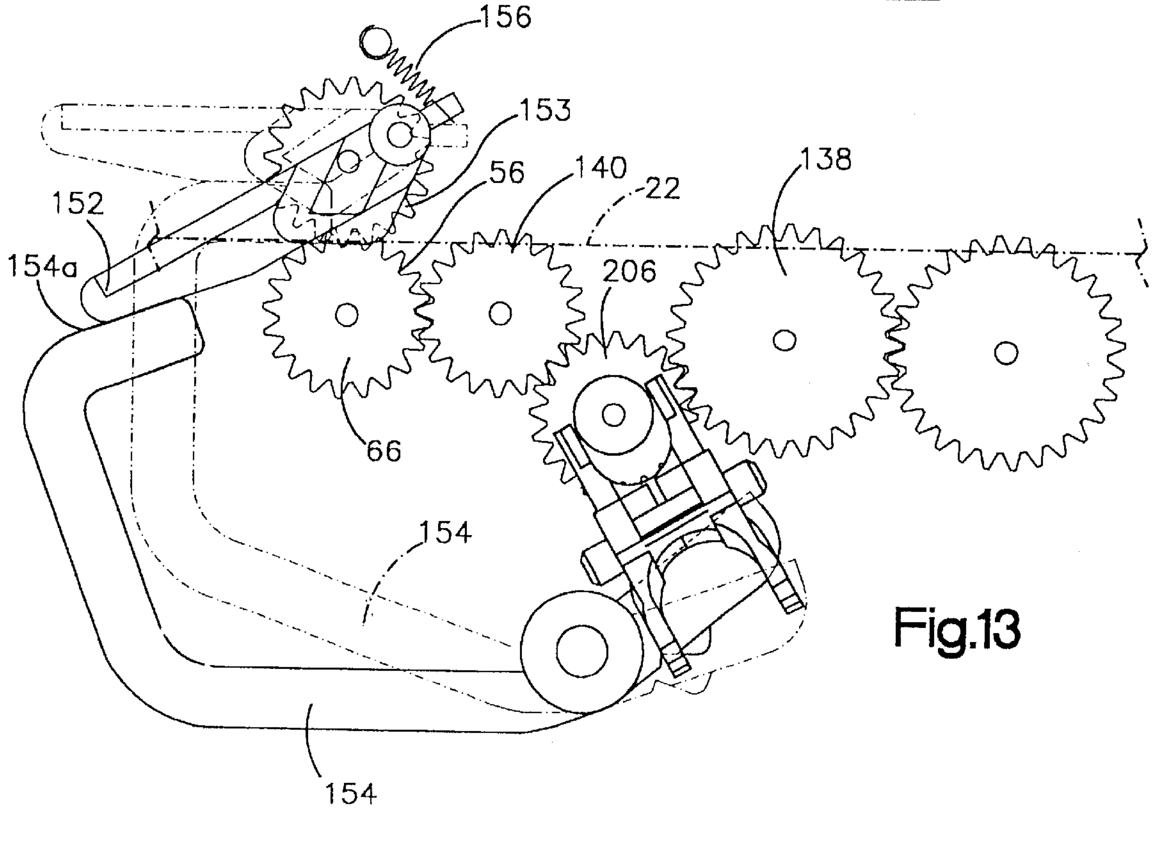
FIGS. 12 and 13 illustrate one embodiment of a feature that inhibits unauthorized removal of a money order from the printer.

According to this embodiment of the present invention, the paper drive clutch solenoid 128 and linkage 142 are used to provide a locking function to inhibit removal of blank money order forms 22 from the feeder 12. As seen in FIGS. 12 and 13, at least one link arm 142*a* includes a transversely extending pin 150. Pin 150 controls the position of a feed roller lock arm 152. In the illustrated embodiment, when the solenoid 128 is de-energized, an intermediate lever arm 154 is lowered so that the lever 152 causes a frictional surface or brake to contact the print media 22 above the drive roller 58. The lock arm 152 operates a brake 153 that includes a gripping surface 153*a* which clamps the print medium 22 between surface 153*a* and the drive roller 56, preventing forward movement of the medium should someone attempt to pull a money order from between the upper and lower feed rollers 50, 56. The arm 152 and the brake 153 are biased towards the engaged position by a spring 156. The geometry of the levers is such that an increase in pull force on the paper increases the resistance to pull, such that the paper will not slip on the gripping surface 153*a*.

When the paper feed solenoid 128 is energized, the operating pin 150 moves to its lower position causing the lever arm 154 to raise in order to raise the lock arm 152 thereby raising the brake 153. This occurs simultaneously with the coupling of the clutch gears 70*a*, 70*b*. Coupling of the clutch gears 70*a*, 70*b* connects the driven roller 56 to the main drive motor 80.

As seen in views 12 and 13, when the solenoid 128 is de-energized the pin 150 rises up. This causes the surface 154*a* of the lever 154 to move downwardly. When the surface 154*a* is lowered, the lever 152 is also lowered, thus pinching the print medium 22.

Figure 10:
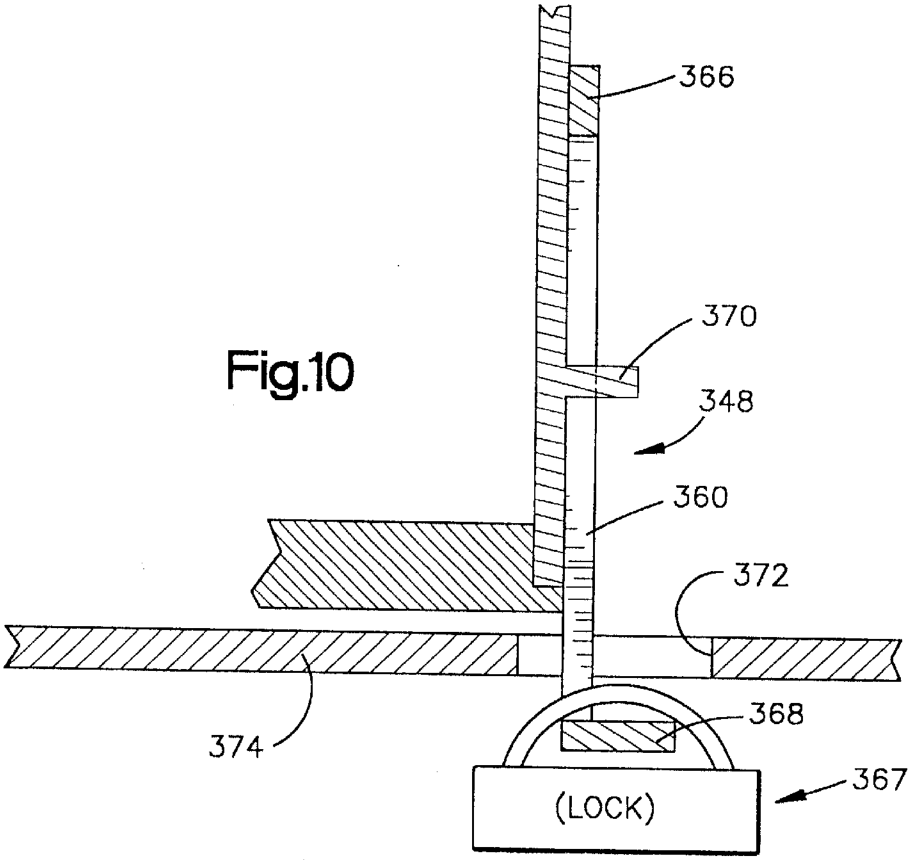
FIG. 10 is a fragmentary, sectional view of the printer module showing a locking arrangement for securing the printer to a support surface.

According to one embodiment the invention, the printing system also includes a second security feature for inhibiting removal of the unit from its mounting location. Referring to FIGS. 2 and 10, a movable locking bracket indicated generally at 348 is slidably held to at least one side frame 350 of the printing module 10. The locking bracket 348 includes a pair of parallel vertical legs 360 defining a vertical elongate slot 3. The legs 360 are joined at their upper ends by a cross-piece 366. The lower ends are connected by a cross-piece 368 which extends at 90° with respect to the plane of the legs 360. A guide tab 370 attached to the side frame 350 extends through the slot formed in the bracket 348 and slidably holds the bracket to the side frame. The bracket 348 is held to a side of the side frame 350 and enclosed by a side cover, such that to gain access to the security bracket 348 when the machine is locked to a surface, the printing module 10 must be disassembled.

A suitable hole 372 is drilled in the support surface 374 on which the printing unit is to be installed. The hole 372 is dimensioned to receive the bracket 348. The installer pulls the bracket 348 downwardly from its retracted position shown in FIG. 4. In the extended position, the bracket 348 extends through the hole 372 in the support surface 374 and is adapted to receive a lock 376 or other locking hardware. The lock 376 is larger than the hole 372. As such, once the lock 376 is installed into the slot 362 of the bracket, the bracket 348 cannot be pulled from the hole 372 in the support surface 374 and, thus, the unit is secured to the support surface 374.

To facilitate the decoupling of the feeder module 12 from the printer module 10, a levering arrangement is provided. Referring to FIGS. 2, 3 and 5A as explained above, the feeder module 12 is snapped onto the printer station and held in position by the snap arms 176 (shown best in FIG. 5A). The feeder module 12 is then locked to the printer by the solenoid 168. In order to remove the feeder module 12 after the solenoid 168 is energized to release the locking mechanism, the clamping force exerted by the snap arms 176, must be overcome. To facilitate removal, a release lever indicated generally by the reference character 400 in FIG. 2, is provided. The release lever 400 includes an externally accessible handle 402 (shown in FIG. 1). When the handle 402 is rotated upwardly about a pivot 404, an abutment member 406 exerts a force against the printer module 10 tending to push the feeder compartment 12 away from the printer module 10. The force applied by the release handle 400 overcomes the clamping force exerted by the snap arms 176 on the bearings 178 and causes decoupling of the feeder module 12 from the printer module 10.

As explained above, the feeder module 12 is secured or locked to the printer station by the solenoid 168 which engages a locking tab 160 forming part of the feeder compartment. In order to release the compartment, power must be applied to the solenoid 168 in order to retract the locking pin 166. Should power be unavailable to energize the solenoid 168, either due to a power failure or a failure in the electronics of the printer, it may be desirable to have a means for separating the modules in order to remove the money orders from the feeder compartment 20. According to one embodiment of the invention, a provision is made for releasing the feeder module 12 from the printer module 10, even if power is unavailable to energize the solenoid 168. This feature, however, allows the user to make this emergency separation only once to ensure that unauthorized personnel do not use this feature to bypass the solenoid locking feature.

Referring to FIGS. 1, 11A and 11B, a single use release tool or key 420 is provided which can be used once in order to release the feeder module 12 from the printer module 10. In the preferred embodiment, the tool includes a knob 421 and an elongate insertion portion 422 which is preferably U-shaped in cross-section. An actuating pin 424 is located at a distal end of the tool. A complementally shaped slot 426 (shown only in FIG. 1) is formed in the side plate of the printer module 10 and is adapted to receive the release tool 420. In order to release the module 12 from the printer module 10, the user inserts the tool 420 into the side frame slot 426. Upon full insertion of the tool, the actuating pin 424 engages an actuating tab 430 extending from the solenoid pin 166 and pushes the pin 166 towards the left as viewed in FIG. 11B, thus moving the pin 166 out of the hole 160*a* formed in the feeder locking tab 160. Upon full insertion of the tool, the feeder module 12 may be removed from the printer module 10.

In order to ensure that the tool can only be used once, spring biased locking tabs 432 are formed or placed on the inside of the insertion section of the tool. Once the tool is pushed into the U-shaped slot 426 formed in the side plate of the printer, the spring loaded tabs move downwardly (as viewed in FIG. 11B) and engage in inside surface 436 of at least one side frame of the printer module 10 and prevent withdrawal of the tool.

In a more preferred embodiment of this feature, a frangible cover portion (the position of which is indicated generally by the reference character 440*a*) is provided by a cover 440 that overlies the slot 426. The frangible cover portion 440*a* may include alignment marks which indicate the position at which the insertion tool should be inserted and upon applying suitable force to the insertion tool 420, the frangible portion separates allowing access to the slot 426.

FIGS. 17–23 illustrate the construction of a ribbon cartridge which may be used in connection with a dot matrix printhead, such as that disclosed earlier. As indicated above, when a dot matrix-type printhead is used, a ribbon located between the print wires and print medium transfers ink to the print media in the region struck by the print wires forming part of the dot matrix printhead. In the preferred and illustrated embodiment, a ribbon cartridge, such as that shown in FIGS. 17–23, may be used to provide the necessary inking. It should also be understood that the disclosed ribbon cartridge can be used in other types of printing apparatus and its utility is not limited to the printing apparatus disclosed in this application.

The ribbon cartridge in some respects is conventional. Its conventional features include a pair of spaced apart arms 600, 602 which define channels 600*a*, 602*a* through which a continuous ribbon 606 is fed and supported. A segment 606*a* of the ribbon 606 is supported between the ends of the arms. At least a portion of this segment of the ribbon is positioned between the printhead and the print medium.

The ribbon cartridge includes a housing indicated generally by the reference character 610 which defines a compartment or chamber 612 for containing the bulk of the continuous ribbon supply. The chamber includes an outlet 612*a* and an outlet 612*b*. As seen best in FIG. 17, the ribbon supply contained within the compartment is arranged in convolutions or folds. As is also conventional, the ribbon moves continuously across the support arms 600, 602 so that a fresh segment 606*a* of the ribbon 606 is always positioned between the printhead and print medium during a printing cycle.

Figure 17:
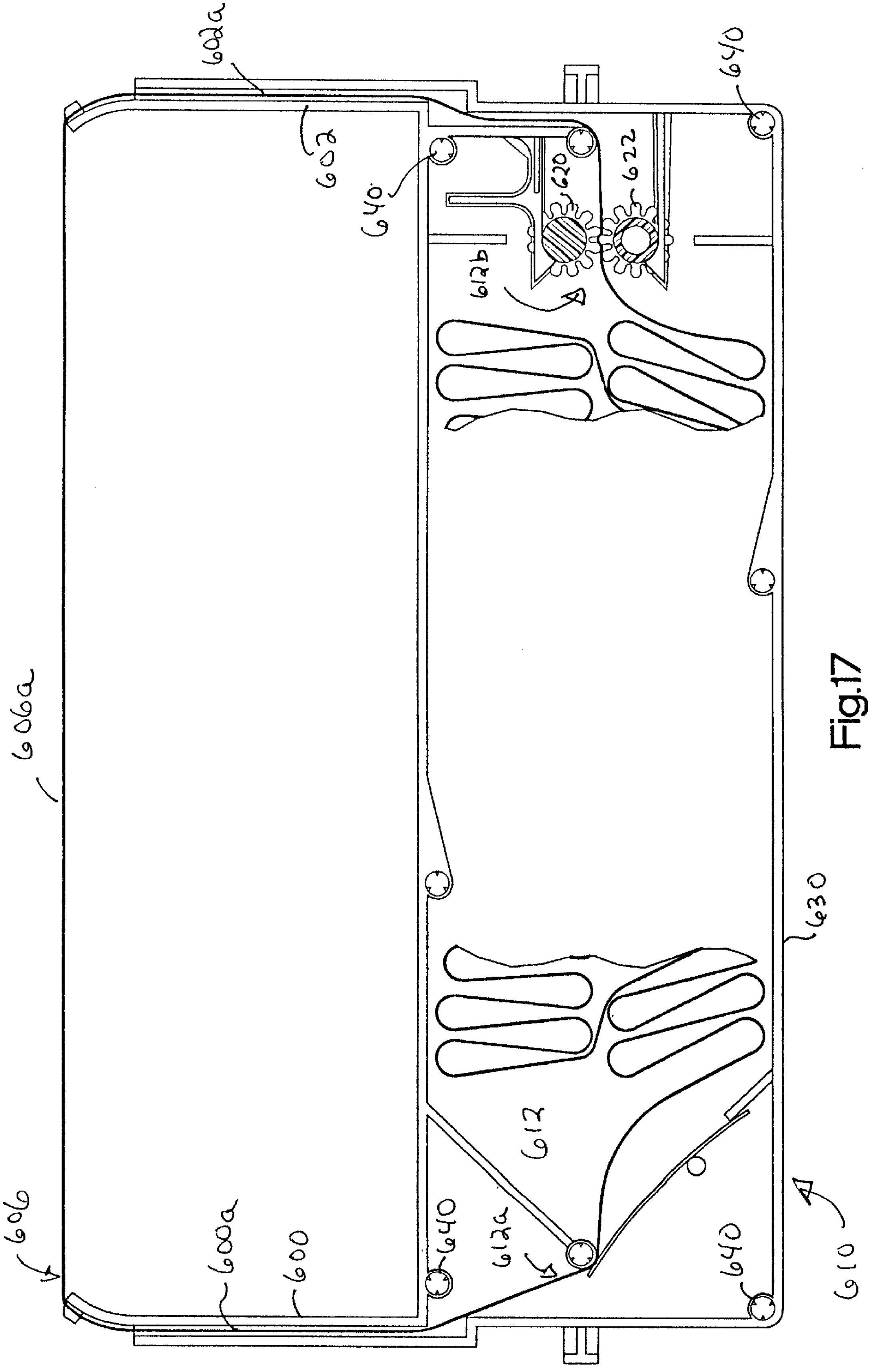
FIG. 17 illustrates a base portion of a ribbon cartridge constructed in accordance with the preferred embodiment of the invention.
Figure 18:
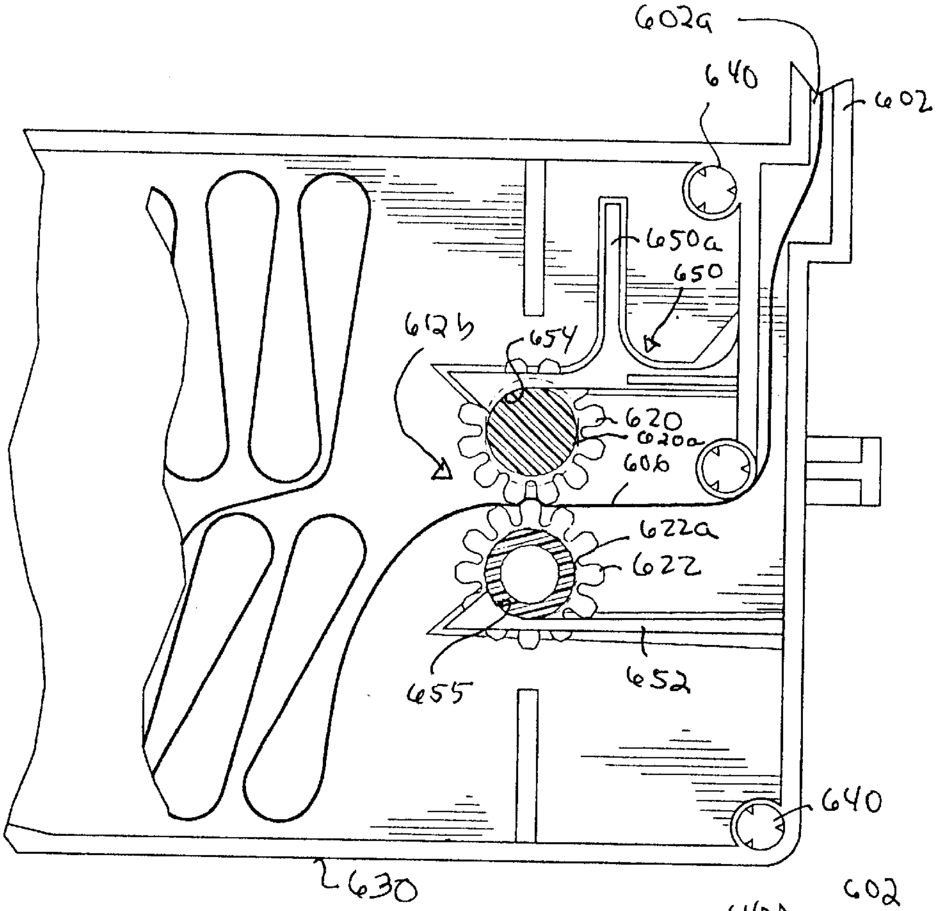
FIG. 18 is a fragmentary view of the base portion of the ribbon cartridge.

In the illustrated embodiment, the ribbon exits the left side, as viewed in FIG. 17, of the ribbon chamber 612, moves rightwardly from the arm 600 to the arm 602 and then returns into the rightside of the ribbon chamber 612. A pair of confronting gears 620, 622 pulls the ribbon from the left side of the housing and feeds it back into the ribbon chamber 612. At least one of the gears 620, 622 includes a drive member 624 which is engageable by a drive mechanism forming part of the printing apparatus. The drive mechanism produces rotation in the gears during printer operation, hence, effecting movement in the ribbon.

Figure 22:
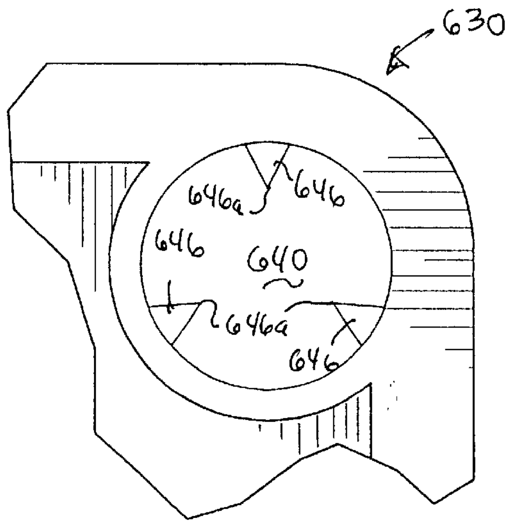
Figure 23:
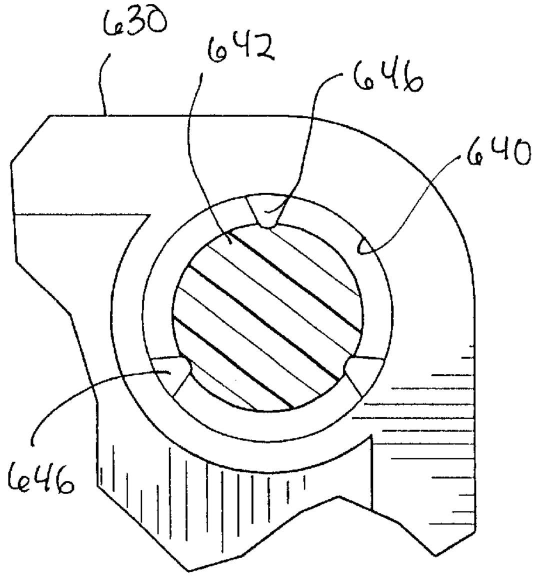

The ribbon housing is defined by a base 630 and an associated cover 632. According to the invention, the cover 632 is held to the base 630 by an interference fit provided by sockets 640 molded into the base 630 which are adapted to receive pins 642 molded into the cover 632. According to the invention, the sockets, as best seen in FIG. 22, include a plurality of tines or ribs 646 which extend radially towards a center of the socket. The pins 642 forming part of the cover 632 are sized to be larger than the opening defined by the ribs 646. Thus, as the cover 632 is pushed onto the base 630, the pins 642 enter the socket 640 and are held in position by the interference fit provided between the ribs 646 and the associated pin 642. In the illustrated embodiment, the ribs 646 are intended to deform in order to allow the pin 642 to enter the socket. The deformation is shown in FIG. 23. With the disclosed invention, tolerances for the sockets 640 and pins 642 can be increased, thus reducing the precision that must be maintained during the molding process. The variation in tolerances that is expected in molding, can be accommodated by the deformation of the socket ribs.

In the illustrated embodiment, three radially directed ribs 646 are used. In the preferred embodiment, the ribs are triangular in cross section and terminate in a relatively sharp edge 646*a*. During installation of the cover, the sharp edges 646*a* are deformed or crushed. It should be understood, however, that a different number of ribs can be used and the shapes of the ribs can be varied and are contemplated by the present invention. The shape of the ribs before and after installation of the cover is best illustrated in FIGS. 22 and 23.

Figure 19:
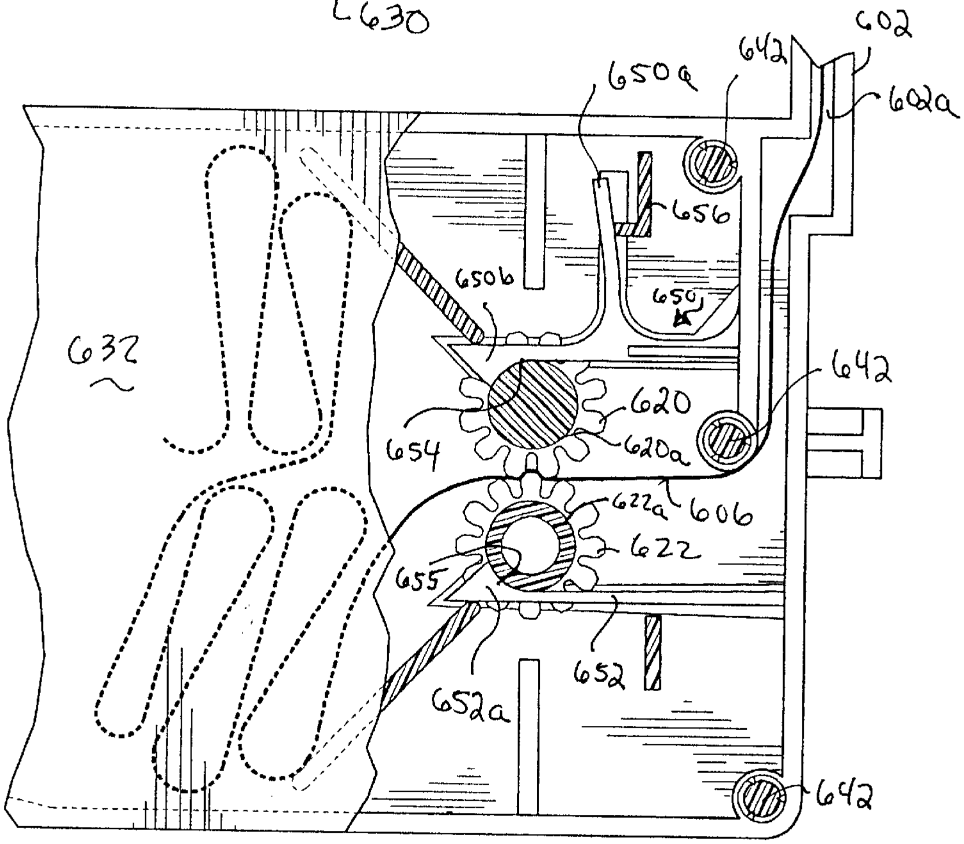
FIG. 19 is a fragmentary view of the assembled ribbon cartridge with portions broken away to show interior detail.
Figure 20:
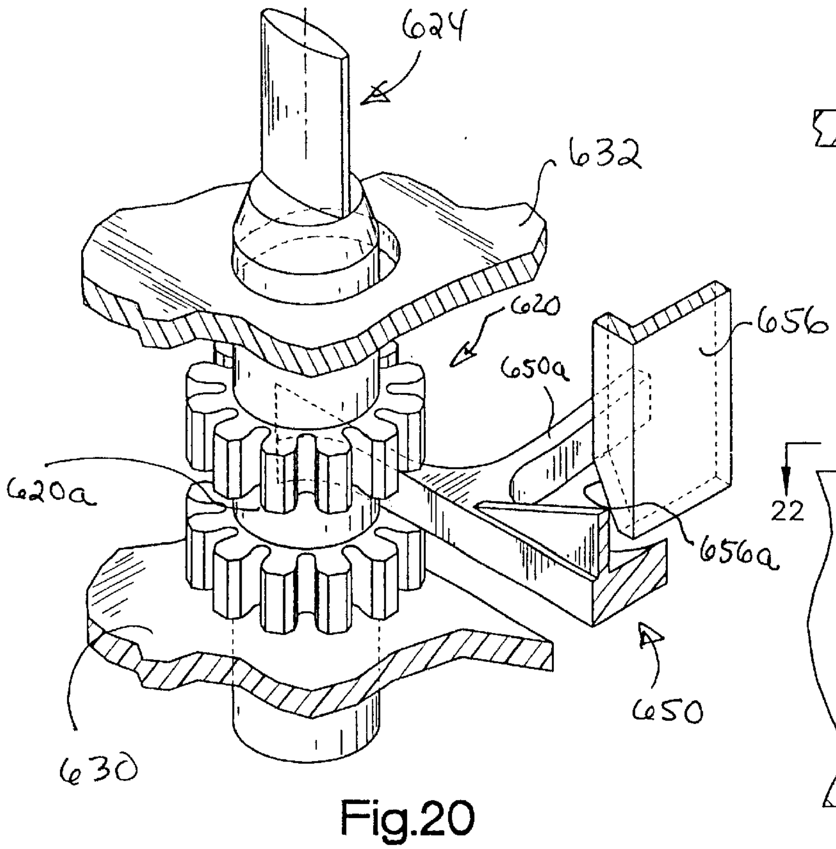
FIG. 20 is a fragmentary perspective view of a ribbon drive/biasing subassembly forming part of the ribbon cartridge.
Figure 21:
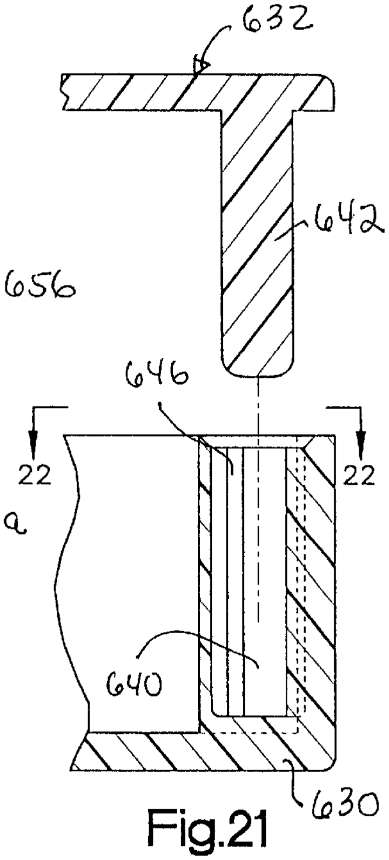
FIGS. 21–23 are fragmentary views of the ribbon cartridge showing a cover to base engagement mechanism constructed in accordance with the preferred embodiment of the invention.

According to another feature of the invention, retaining fingers 650, 652 (see FIGS. 18–20) are molded into the housing which serve to maintain position of the ribbon drive gears 620, 622 during assembly and which also apply pressure to the gears so that the gears are urged together and provide a force at their nip to maintain engagement with the ribbon 606. According to the invention, at least one of the retaining/biasing fingers 650 include a T-bar section 650*a*. In prior constructions, the retaining arms were simply molded into the housing in a cantilevered fashion with the resiliency of the plastic providing the necessary biasing. In the illustrated construction, the T-bar 650*a* is used to apply a biasing force to the arm 650. In the preferred construction, an abutment 656 for applying a biasing force to the T-bar 650*a* is molded into the cover 632. The abutment 656 includes a tapered portion 656*a* (shown in FIG. 20) which cams the T-bar 650*a* towards the left as viewed in FIG. 19, as the cover 632 is assembled to the base 630. As seen in FIG. 19, after assembly, the T-bar 650*a* is bent leftwardly from its molded position by the abutment 656 and, hence, produces a lateral biasing force on its associated gear 620.

The biasing force is applied to the associated drive gear 620 by a pressure applying finger-like portion 650*b*. As seen best in FIGS. 18 and 19, the portion 650*b* defines an arcuate surface 654 located in a confronting relationship with a hub segment 620*a* (see FIG. 20) formed in the drive gear 620. As should be apparent, the arm 650 applies a biasing force to the gear 620 urging it towards the gear 622 on a line that includes the nip 655 formed by the gears 620, 622. It should be noted that the arm 652 has a similarly shaped pressure applying portion 652*a* including an arcuate surface 655 that rides against a hub surface 622*a* formed on the gear 622.

It has been found that with the disclosed T-bar arrangement, a lower torque is necessary to rotate the gears 620, 622 to advance the ribbon 606. In addition, loss of resiliency in the retaining arm 650 over time due to fatigue, is reduced.

In the preferred and illustrated embodiment, the drive gears 620, 622 are identical and each includes the externally accessible drive portion 624. Preferably, the gears are positioned in a 180° relationship so that the drive segment 624 of one gear 620 extends through the cover 632, whereas the drive segment 624 (not shown) of the other gear 622 extends through the base 630 and is engageable by a ribbon drive member forming part of the printer. The drive segment 624 that extends through the cover provides a means by which the operator can manually advance the ribbon should that become necessary to, for example, take up slack after installation of the ribbon cartridge in the printer.

Although the invention has been described in detail, it should be understood that those skilled in the art can make various changes, alterations and substitutions to the embodiments described herein without departing from the spirit or scope of the invention which is solely defined by the following claims.

What is claimed is:

1. A method for issuing payment instruments, comprising the steps of:

a) providing an enclosed compartment containing at least one blank payment instrument;

b) activating a feed mechanism to advance said blank payment instrument to a verifying position;

c) while at said verifying position, reading indicia preprinted on said blank payment instrument form;

d) transmitting data related to said indicia to a host;

e) verifying said transmitted data;

f) issuing a command enabling a printer to print said payment instrument, if said transmitted data is verified by said host.

2. The method of claim 1, wherein said verifying step is achieved using software and data stored by said host.

3. The method of claim 1, wherein said preprinted indicia on said blank payment instrument comprises a bar code.

4. The method of claim 1, wherein said enclosed compartment contains a plurality of interconnected blank payment instruments and said method further includes the step of severing a lead one of a supply of blank payment instruments after said data is verified and prior to issuing said command to enable said printer to print on said instrument.

5. A method for issuing payment instruments, comprising the steps of:

a) providing an enclosed compartment containing a supply of serially connected blank payment instruments, each payment instrument carrying a preprinted identifying indicia;

b) activating a feed mechanism to advance a lead one of said blank payment instrument towards a verifying position;

c) sensing a leading edge of said one blank payment instrument and then advancing said payment instrument to said verifying position;

d) sensing and reading said preprinted identifying indicia on said blank payment instrument;

e) transmitting information related to said preprinted identifying indicia to a host;

f) using said host to verify said transmitted data;

g) upon verifying said transmitted data, issuing a command to said printer to print a receipt portion of said blank payment instrument;

h) advancing said lead one of said blank payment instruments a predetermined distance and thereupon severing said lead one of said payment instrument from said supply using a severing mechanism;

i) issuing a command enabling said printer to print a negotiable portion of said payment instrument;

j) ejecting said printed payment instrument.

6. The method of claim 5, wherein said step of reading said preprinted indicia is achieved by using a printhead carried sensor to scan said preprinted indicia.

7. The method of claim 1, further comprising the steps of:

a) following the replenishment of the supply of blank payment instruments into said closed compartment, advancing a lead one of said blank payment instruments to said verifying position;

b) while at said verifying position, reading indicia preprinted on said payment instrument; and c) retracting said lead blank payment instrument to an initial position.

8. The method of claim 7, further comprising the step of comparing data related to said indicia read during said verifying step and comparing said data with previously stored data.

9. The method of claim 5, further comprising the steps of:

a) upon attaching said enclosed compartment to a payment issuing mechanism, advancing a lead one of said blank payment instruments to a verifying position;

b) reading said preprinted identifying indicia on said blank payment instrument; and c) retracting said blank payment instrument to an initial position.

* * * * *